(12) United States Patent
Kunimatsu

(10) Patent No.: US 6,359,624 B1
(45) Date of Patent: Mar. 19, 2002

(54) APPARATUS HAVING GRAPHIC PROCESSOR FOR HIGH SPEED PERFORMANCE

(75) Inventor: Atsushi Kunimatsu, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/274,305

(22) Filed: Mar. 23, 1999

Related U.S. Application Data

(63) Continuation-in-part of application No. 08/797,665, filed on Jan. 31, 1997, now abandoned.

(30) Foreign Application Priority Data

Feb. 2, 1996 (JP) .............................................. 8-17790

(51) Int. Cl.⁷ .............................................. G06F 15/16
(52) U.S. Cl. ...................... 345/503; 345/506; 345/561; 345/592
(58) Field of Search ................................ 345/418, 419, 345/422, 433, 435, 438, 473–475, 501–506, 521, 421, 592, 539, 561

(56) References Cited

U.S. PATENT DOCUMENTS

| | | | |
|---|---|---|---|
| 5,408,606 A | | 4/1995 | Eckart ........................ 345/502 |
| 5,544,306 A | | 8/1996 | Deering et al. .............. 345/507 |
| 5,596,685 A | * | 1/1997 | Ashton ........................ 345/421 |
| 5,671,401 A | | 9/1997 | Harrell ........................ 345/505 |
| 5,694,143 A | | 12/1997 | Fielder et al. ............... 345/112 |
| 5,717,440 A | | 2/1998 | Katsura et al. .............. 345/513 |
| 5,917,496 A | * | 6/1999 | Fujita et al. ................. 345/422 |
| 5,940,091 A | * | 8/1999 | Nakamura .................... 345/521 |
| 6,025,853 A | * | 2/2000 | Baldwin ....................... 345/506 |
| 6,054,991 A | * | 4/2000 | Crane et al. ................. 345/420 |
| 6,057,847 A | * | 5/2000 | Jenkins ........................ 345/422 |

OTHER PUBLICATIONS

Molnar et al., "PixelFlow: High–Speed Rendering Using Image Composition", Computer Graphics, 26, 2, Jul. 1992; ACM–0–89791–479–1/92/009/0231 SIGGRAPH '92, p. 231.

* cited by examiner

*Primary Examiner*—Ulka J. Chauhan
(74) *Attorney, Agent, or Firm*—Foley & Lardner

(57) ABSTRACT

An information processing apparatus secures a wide band width in a graphics bus and draws graphics at high speed and low cost. The apparatus employs graphics processing units connected in parallel. Each of the units is formed on a chip and has a graphics processor and a graphics memory, to provide color information and select information. The outputs of the units are selected through a tournament.

11 Claims, 22 Drawing Sheets

FIG.2
PRIOR ART

VERTEX COORDINATES OF TRIANGLE

VERTEX 1 : x1, y1, z1
VERTEX 2 : x2, y2, z2
VERTEX 3 : x3, y3, z3

COLOR DATA OF TRIANGLE

VERTEX 1 : r1, g1, b1, a1
VERTEX 2 : r2, g2, b2, a2
VERTEX 3 : r3, g3, b3, a3

TEXTURE COORDINATES OF TRIANGLE

VERTEX 1 : u1, v1
VERTEX 2 : u2, v2
VERTEX 3 : u3, v3

FIG.3
PRIOR ART $A1 = y2 - y3$
$A2 = y3 - y1$
$A3 = y1 - y2$
$B1 = x3 - x2$
$B2 = x1 - x3$
$B3 = x2 - x1$
$E1 = A2 \star B3 - A3 \star B2$
$F1 = 1/E1$ $TR1 = r1 - r2$
$TR2 = r1 - r3$
$TG1 = g1 - g2$
$TG2 = g1 - g3$
$TB1 = b1 - b2$
$TB2 = b1 - b3$
$TA1 = a1 - a2$
$TA2 = a1 - a3$
$TZ1 = z1 - z2$
$TZ2 = z1 - z3$
$TZA1 = z1 \star A1$
$TZB1 = z1 \star B1$
$TZA2 = z2 \star A2$
$TZB2 = z2 \star B2$
$TZA3 = z3 \star A3$
$TZB3 = z3 \star B3$ $AR = A2 \star TR1 + A3 \star TR2$
$BR = B2 \star TR1 + B3 \star TR2$
$AG = A2 \star TG1 + A3 \star TG2$
$BG = B2 \star TG1 + B3 \star TG2$
$AB = A2 \star TB1 + A3 \star TB2$
$BB = B2 \star TB1 + B3 \star TB2$
$AA = A2 \star TA1 + A3 \star TA2$
$BA = B2 \star TA1 + B3 \star TA2$
$AZ = A2 \star TZ1 + A3 \star TZ2$
$BZ = B2 \star TZ1 + B3 \star TZ2$

FIG.4 PRIOR ART

DDA PARAMETERS FOR TRIANGLE
$\triangle/\triangle x$ : CHANGE IN GIVEN DDA FOR CHANGE OF 1 IN x
$\triangle/\triangle y$ : CHANGE IN GIVEN DDA FOR CHANGE OF 1 IN y
INITIAL VALUE : INITIAL VALUE OF GIVEN DDA

|  | DDA-EDGE-1 | DDA-EDGE-2 | DDA-EDGE-3 |
| --- | --- | --- | --- |
| $\triangle/\triangle x$ | A1 | A2 | A3 |
| $\triangle/\triangle y$ | B1 | B2 | B3 |
| INITIAL VALUE | E1 OR 0 | E1 OR 0 | E1 OR 0 (☆) |

(☆)E1 OR 0 IS DEPENDENT ON A VERTEX HAVING
A MINIMUM x-COORDINATE. IF VERTEX 1 HAS A MINIMUM
x-COORDINATE, AN INITIAL VALUE OF DDA-EDGE-1 IS E1,
THAT OF DDA-EDGE-2 IS 0, AND THAT OF DDA-EDGE-3 IS 0.

|  | DDA x | DDA g | DDA b | DDA a | DDA z |
| --- | --- | --- | --- | --- | --- |
| $\triangle/\triangle x$ | AR☆F1 | AG☆F1 | AB☆F1 | AA☆F1 | AZ☆F1 |
| $\triangle/\triangle y$ | BR☆F1 | BG☆F1 | BB☆F1 | BA☆F1 | BZ☆F1 |
| INITIAL VALUE | rstart | gstart | bstart | astart | ztart |

|  | DDA u |
| --- | --- |
| $\triangle/\triangle x$ | u2☆TZA2 + u3☆TZA3 + u1☆TZA1 |
| $\triangle/\triangle y$ | u2☆TZB2 + u3☆TZB3 + u1☆TZB1 |
| INITIAL VALUE | zstart☆ustart☆E1 |

|  | DDA v |
| --- | --- |
| $\triangle/\triangle x$ | v2☆TZA2 + v3☆TZA3 + v1☆TZA1 |
| $\triangle/\triangle y$ | v2☆TZB2 + v3☆TZB3 + v1☆TZB1 |
| INITIAL VALUE | zstart☆ustart☆E1 |

|  | DDA g |
| --- | --- |
| $\triangle/\triangle x$ | TZA2 + TZA3 + TZA1 |
| $\triangle/\triangle y$ | TZB2 + TZB3 + TZB1 |
| INITIAL VALUE | zstart☆E1 |

VALUES rstart, gstart, bstart, astart, zstart, zstart, ustart, and vstart ARE
r-, g-,b-, a-,z-,u-, AND V-VALUES OF A VERTEX HAVING A
MINIMUM x-COORDINATE

APPARATUS HAVING GRAPHIC PROCESSOR FOR HIGH SPEED PERFORMANCE

This application claims the benefit under 35 U.S.C. Section 120 of the filing date of application Ser. No. 08/797,665, filed Jan. 31, 1997, now abandoned the entire content of which is hereby incorporated by reference.

This APPLN is a C-I-P of Ser. No. 08/797,665 filed Jan. 31, 1997 Abn.

BACKGROUND OF THE INVENTION

1. Field of the Invention

The present invention relates to an information processing apparatus having a general-purpose processor, a main memory, a graphics processor, a graphics memory, etc., to draw graphics such as polygons and sprites.

2. Description of the Prior Art

FIG. 1 shows an information processing apparatus according to a prior art, for drawing graphics.

The apparatus has a processor unit 1, a graphics processor unit (GPU) 3, a main memory 5, and a main bus 7 that connects them to one another. The GPU 3 is connected to a graphics memory 9 through a graphics bus 11.

The GPU 3 has a pre-process part 13 and a main process part 15. The main process part 15 employs digital differential analyzers (DDAs), to read texture information from the graphics memory 9, carry out rendering on pixels, and write a resultant image in a frame buffer in the graphics memory 9. The pre-process part 13 calculates parameters such as initial and differential values for the DDAs of the main process part 15.

The processor unit 1 has a processor core 17, which reads a program from the main memory 5 and executes the same. According to the program, the processor core 17 generates GPU command information such as the two-dimensional coordinates and color information of each vertex of a polygon to draw. The processor core 17 employs a geometry translation processor 19 for translating three-dimensional coordinates into two-dimensional coordinates. According to the program, the processor unit 1 adds, to the GPU command information, an identification command indicating the kind of the polygon to draw. According to the GPU command information and additional information, the processor unit 1 generates a GPU command and sends it to the GPU 3 through the main bus 7, so that the GPU 3 may draw the polygon. The GPU command may be sent through a dedicated bus instead of the main bus 7. A speed of sending the GPU command of the processor unit 1 may not be equal to a speed of drawing the polygon of the GPU 3. In this case, the main memory 5 buffers the GPU command, to absorb the speed difference.

According to the GPU command from the processor unit 1, the GPU 3 draws the polygon. FIG. 2 shows data of vertexes of a triangle as an example of the polygon to draw. The triangle has three vertexes whose coordinates are sent with a triangle drawing instruction from the processor unit 1 to the GPU 3. In FIG. 2, a variable having a prefix "x" represents an x-coordinate, one having a prefix "y" a y-coordinate, one having a prefix "z" a z-coordinate, one having a prefix "r" red color information, one having a prefix "g" green color information, one having a prefix "b" blue color information, one having a prefix "a" an a-coordinate, one having a prefix "u" a u-coordinate, and one having a prefix "v" a v-coordinate of a given vertex.

The pre-process part 13 carries out calculations shown in FIG. 3 and sends parameters shown in FIG. 4 to the main process part 15. FIG. 5 shows a standard arrangement of the pre-process part 13 for carrying out the calculations of FIG. 3.

The main process part 15 sets the received parameters in the DDAs, reads texture information from the graphics memory 9, and draws the polygon with the use of the DDAs.

FIG. 6 shows an example of the main process part 15 having the DDAs. The DDAs include DDA-u, DDA-v, and DDA-q for determining texture coordinates to read, DDA-r, DDA-g, DDA-b and DDA-a for determining colors to draw, a DDA-z for determining a z-buffer, and DDA-edge-1, DDA-edge-2, and DDA-edge-3 for determining coordinates to draw.

A method of drawing graphics will be explained. According to determined coordinates, a z-value is read out of the frame buffer in the graphics memory 9. The z-value is compared with a corresponding one in the determined coordinates. If the read z-value is closer to a view point than the determined one, the point in question is drawn. If not so, the point is not drawn, and the next point is processed. Drawing the point is carried out by overwriting the z-value and color information for the point in the frame buffer.

The color information in the frame buffer is scanned and displayed on a display.

FIG. 7 shows an information processing apparatus according to another prior art, employing two GPUs 3a and 3b to improve graphics drawing performance.

The prior art fabricates the GPUs and a graphics memory on separate chips, to restrict a band width in the graphics bus 11 and hinder high-speed I/O operations with respect to the GPUs. The band width is calculated by multiplying the operation frequency of the bus by bit width. The prior art is incapable of letting the apparatus demonstrate high performance even if the GPUs can operate at high speed.

The apparatus of FIG. 7 having the multiple GPUs may be inexpensive but has only one graphics memory. This and the band width in the graphics bus result in not fully utilizing the capacity of the GPUs. It is possible to provide a graphics memory for each of the GPUs. This, however, increases the quantities of wiring and graphics DRAMs, to increase the cost.

SUMMARY OF THE INVENTION

An object of the present invention is to provide an information processing apparatus having a GPU and a graphics memory that are formed in a multi-processor system, to realize high graphics drawing performance.

Another object of the present invention is to provide an information processing apparatus having a plurality of sub-systems in a cascade fashion, to easily modify the design of the whole system in order to improve the performance by increasing the number of the sub-systems available.

In order to solve the above-mentioned objects, in accordance with the present invention, an information processing apparatus comprising a plurality of graphic sub-systems connected in series to each other, each of said graphic sub-systems comprises: a processing unit for executing a graphical program; a main memory connected to said processing unit for storing said graphical program and graphical data for use in executing said graphical program; a graphic processor unit connected to said processing unit for performing calculation required to obtain internal video data with z-values as prepared by said processing unit in accordance with said graphical program, wherein said graphic processor unit is provided with a pair of frame buffer areas and a pair of z buffer areas are defined for performing a double buffering technique; and a graphic memory connected to said graphic processor; a selector circuit connected to said graphic processor for receiving said internal video data with z-values and external video data with z-values and outputting said combinational video data with z-values by comparing the z-values of said internal video data and said external video data.

In a preferred embodiment, the information processing apparatus further comprises a controller connected to an external device and connected to said graphic sub-systems through a common bus for receiving command data from an external device and broadcasting said command data to said graphic sub-systems respectively through said common bus.

In a further preferred embodiment, said external device is a Joystick for playing a video game and said command data is generated in response to manipulation of said Joystick by a player.

In a further preferred embodiment, said external video data further includes an α-value, and said selector circuit is capable of functioning as a multiplexer and connected to said graphic processors of said graphic sub-systems for receiving said internal video data and said external video data and outputting said combinational video data by comparing the z-values of said internal video data and said external video data and referring to said α-value.

In accordance with another aspect of the present invention, an information processing apparatus comprising a plurality of graphic sub-systems, each of which comprises: a processing unit for executing a graphical program; a main memory connected to said processing unit for storing said graphical program and graphical data for use in executing said graphical program; a graphic processor unit connected to said processing unit for performing calculation required to obtain internal video data with z-values as prepared by said processing unit in accordance with said graphical program, wherein said graphic processor unit is provided with a pair of frame buffer areas and a pair of z buffer areas are defined for performing a double buffering technique; and a graphic memory connected to said graphic processor, wherein said information processing apparatus further comprising a controller connected to said graphic sub-systems through a common bus and a selector circuit connected to said graphic processors of said graphic sub-systems for receiving said internal video data and outputting combinational video data by comparing the z-values of said internal video data of the respective graphic sub-systems.

In a preferred embodiment, said graphic program includes first and second modules, the first module consisting of routines for mathematical calculations required to determine motion data as interpreted in the three dimensional motion space and the second module consisting of routines for mathematical calculations required to a two-to-three dimensional conversion.

In a further preferred embodiment, the first module consisting of routines for mathematical calculations required to determine motion data a macro objects as interpreted in the three dimensional motion space and the second module consisting of routines for mathematical calculations required to divide said macro object into a plurality of micro objects.

In a further preferred embodiment, the second module consisting of routines for mathematical calculations required for light source handling.

In a further preferred embodiment, the first module is redundantly executed in each of said graphic sub-systems while the second module is differently executed in each of said graphic sub-systems in accordance with at least one of objects assigned to said each of said graphic sub-systems.

In a further preferred embodiment, said at least one of objects is a character of a video game.

In a further preferred embodiment, said external video data further includes an α-value, and said selector circuit is capable of functioning as a multiplexer and connected to said graphic processors of said graphic sub-systems for receiving said internal video data and said external video data and outputting said combinational video data by comparing the z-values of said internal video data and said external video data and referring to said α-value.

In accordance with another aspect of the present invention, an information processing apparatus comprising a plurality of graphic sub-systems connected in series to each other, each of said graphic sub-systems comprises: a processing unit for executing a graphical program; a main memory connected to said processing unit for storing said graphical program and graphical data for use in executing said graphical program; a graphic processor unit connected to said processing unit for performing calculation required to obtain internal video data with z-values as prepared by said processing unit in accordance with said graphical program; a graphic memory connected to said graphic processor; an input port for receiving external video data with z-values; an output port for outputting combinational video data of said internal video data and said external video data; and a selector circuit connected to said graphic processor for receiving said internal video data and said external video data and outputting said combinational video data by comparing the z-values of said internal video data and said external video data.

In a preferred embodiment, the information processing apparatus further comprises a controller connected to an external device and connected to said graphic sub-systems through a common bus for receiving command data from an external device and broadcasting said command data to said graphic sub-systems respectively through said common bus.

In a further preferred embodiment, said external device is a joystick for playing a video game and said command data is generated in response to manipulation of said joystick by a player.

In a further preferred embodiment, said two-dimensional view to be actually displayed on the monitor is a bird's-eye view of the geographical data as prepared by the graphical program.

In a further preferred embodiment, one of said sub-systems is prepared responsible for handling two-dimensional view of one or more motion character while another of said sub-systems is prepared responsible for handling two-dimensional view of the background view.

In a further preferred embodiment, said external video data further includes an α-value, and said selector circuit is capable of functioning as a multiplexer and connected to said graphic processors of said graphic sub-systems for receiving said internal video data and said external video data and outputting said combinational video data by comparing the z-values of said internal video data and said external video data and referring to said α-value.

In accordance with another aspect of the present invention, an information processing apparatus comprising a plurality of graphic sub-systems connected in series to each other, each of said graphic sub-systems comprises: a processing unit for executing a graphical program; a main memory connected to said processing unit for storing said graphical program; a graphic processor unit connected to said processing unit for performing calculation required to obtain internal video data with z-values and an α-value as prepared by said processing unit in accordance with said graphical program; a graphic memory connected to said graphic processor; an input port for receiving external video data with z-values; an output port for outputting combinational video data of said internal video data and said external video data; and a selector-multiplier circuit connected to said graphic processor for receiving said internal video data and said external video data and outputting said combinational video data in accordance with α value by comparing the z-values of said internal video data and said external video data.

In a preferred embodiment, the information processing apparatus further comprises a controller connected to an external device and connected to said graphic sub-systems through a common bus for receiving command data from an external device and broadcasting said command data to said graphic sub-systems respectively.

In a further preferred embodiment, said external video data further includes an α-value, and said selector circuit is capable of functioning as a multiplexer and connected to said graphic processors of said graphic sub-systems for receiving said internal video data and said external video data and outputting said combinational video data by comparing the z-values of said internal video data and said external video data and referring to said α-value.

BRIEF DESCRIPTION OF THE DRAWINGS

FIG. 2 shows commands sent from a processor unit to a graphics processor unit (GPU) in the apparatus of FIG. 1;

FIG. 3 shows calculations carried out by a pre-process part of the apparatus of FIG. 1;

FIG. 4 shows parameters sent from the pre-process part to a main process part in the apparatus of FIG. 1;

DETAILED DESCRIPTION OF THE EMBODIMENTS

Figure 1:
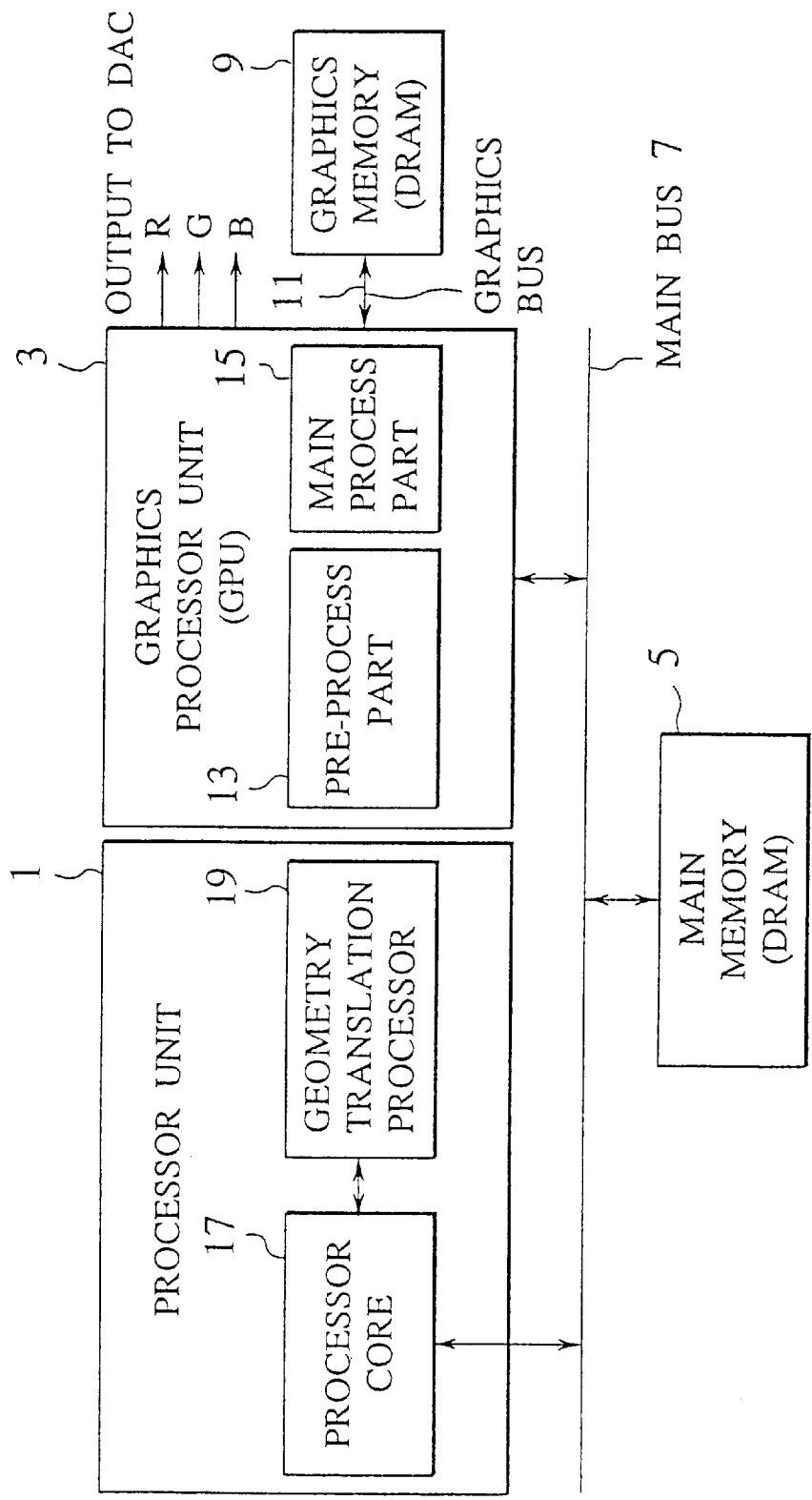
FIG. 1 shows an image processing apparatus for drawing graphics according to a prior art.
Figure 5:
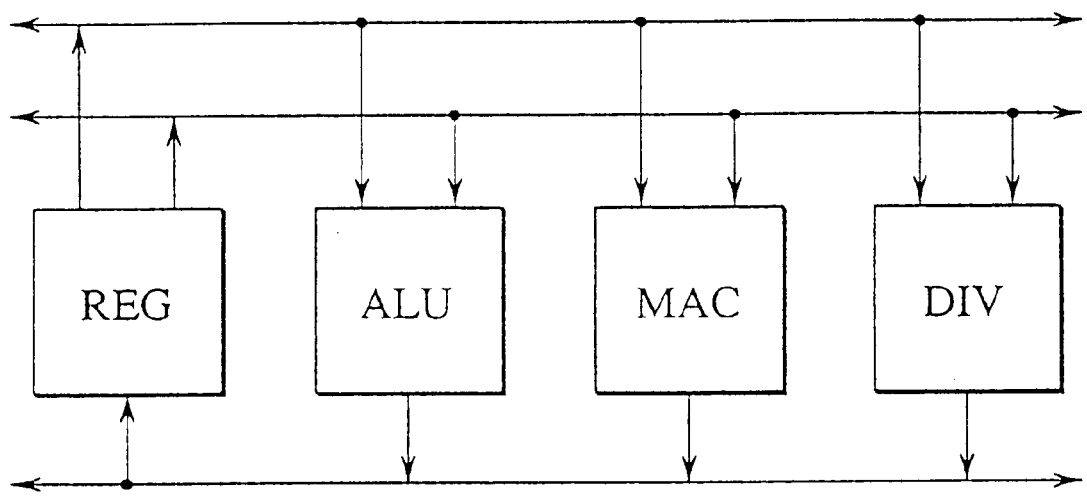
FIG. 5 shows an example of the pre-process part of the apparatus of FIG. 1.
Figure 6:
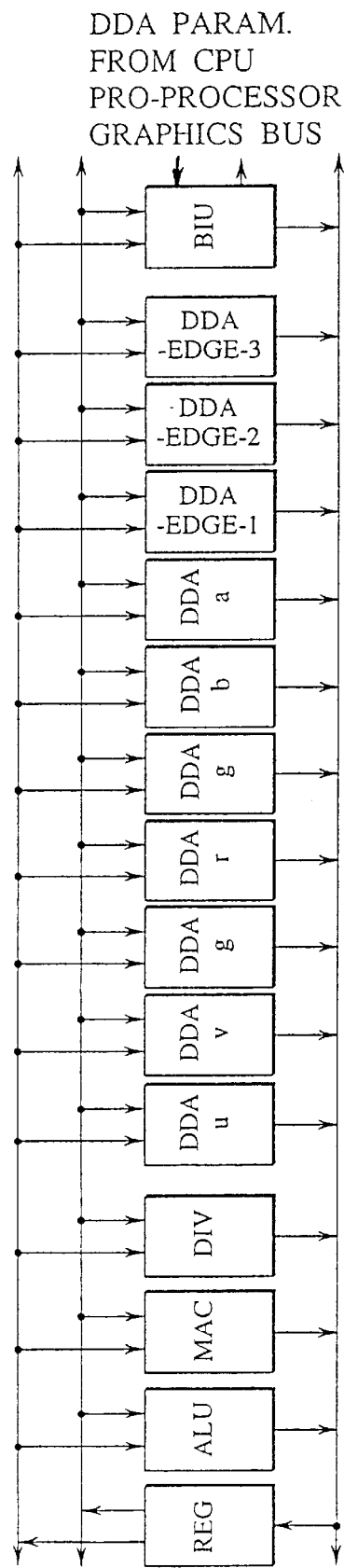
FIG. 6 shows an example of the main process part of the apparatus of FIG. 1.
Figure 7:
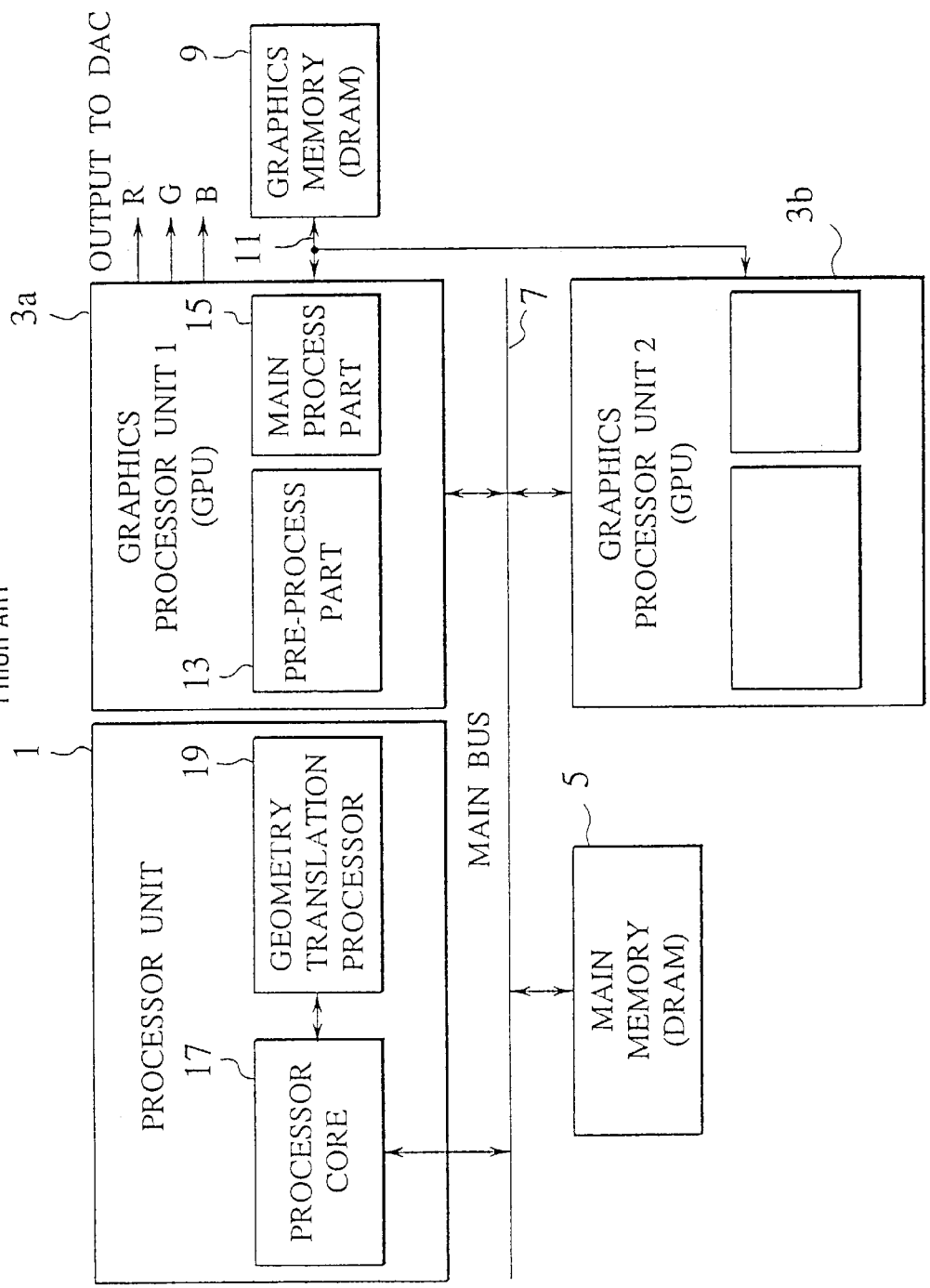
FIG. 7 shows an information processing apparatus for drawing graphics according to another prior art.
Figure 8:
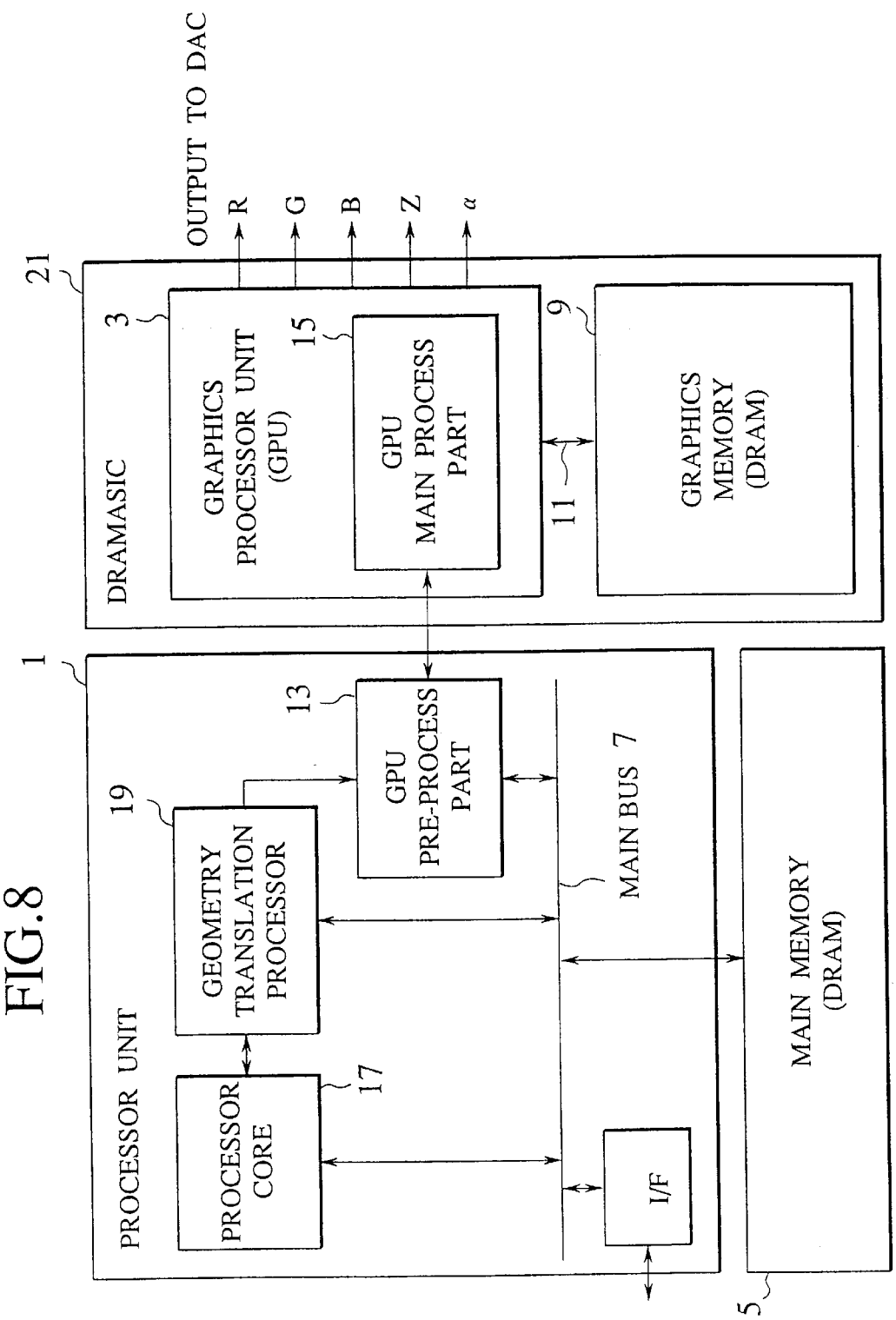
FIG. 8 shows an information processing apparatus employing a single GPU according to a first embodiment of the present invention.

FIG. 8 shows an information processing apparatus employing a single graphic processor unit (GPU) according to the first embodiment.

The apparatus has a processor unit 1, a main memory 5, and a main bus 7 for connecting them to each other. The GPU 3 and a graphics memory 9 are connected to each other through a graphics bus 11 and form a semiconductor integrated circuit, i.e., a DRAM ASIC GPU 21 fabricated on a single chip.

The GPU 3 involves a pre-process part 13 and a main process part 15. The main process part 15 employs digital differential analyzers (DDAs), to read texture information from the graphics memory 9, carry out rendering on the pixels of an output image, and write a result in a frame buffer in the graphics memory 9. The pre-process part 13 calculates parameters such as initial and differential values for the main process part 15.

The processor unit 1 has a processor core 17, which reads a program from the main memory 5 and executes the same. According to the program, the processor core 17 generates GPU command information. A geometry translation processor 19 translates three-dimensional coordinates into two-dimensional coordinates. According to the program, the processor unit 1 adds, to the GPU command information, an identification command indicating the kind of a polygon to draw. The processor unit 1 sends the GPU command with the additional information to the pre-process part 13 through the main bus 7. The pre-process part 13 analyzes the command, calculates DDA parameters, and sends them to the main process part 15, which draws the polygon accordingly.

According to the embodiment, the pre-process part 13 is connected to the main process part 15 through a dedicated bus instead of the main bus 7. To simplify hardware, it is possible to use the main bus 7 to transfer data from the pre-process part 13 to the main process part 15. If a speed of providing a GPU command of the processor unit 1 is not equal to a drawing speed of the GPU 3, the main memory 5 may buffer the GPU command, to absorb the speed difference.

Information necessary for drawing a triangle and the calculations, arrangements, and operations of the pre-process part 13 and main process part 15 are the same as those of the prior art.

According to the present invention, the graphics bus 11 is inside the chip, and therefore, there is no need of driving I/O pins. Compared with fabricating the GPU 3 and graphics memory 9 on separate chips like the prior art, the embodiment realizes a high frequency and a wide band width in the graphics bus 11 and reduces the wiring area of the graphics bus 11. Compared with fabricating the graphics bus 11 outside the chip, forming the graphics bus 11 inside the chip is advantageous in enlarging a band width, which is calculated by multiplying an operation frequency by a bit width, in the graphics bus 11.

A bus outside a chip and a bus inside a chip have the following relationship:

$$Fex \times Cex \times Vex \times Vex \times Bex > Fin \times Cin \times Vin \times Vin \times Bin \qquad (1)$$

where Fex is a clock frequency of the outside bus, Cex is I/O capacitance of the outside bus, Vex is a signal voltage in the outside bus, Bex is the number of bits in the outside bus, Fin is a clock frequency of the inside bus, Cin is I/O capacitance of the inside bus, Vin is a signal voltage in the inside bus, and Bin is the number of bits in the inside bus.

If the power consumption is the same in the outside and inside buses, the band width of the inside bus is as follows:

$$Fin \times Bin = (Cex \times Vex \times Vex)/(Cin \times Vin \times Vin) \ (Fex \times Bex) \qquad (2)$$

Namely, the inside bus can secure a band width $(Cex \times Vex \times Vex)/(Cin \times Vin \times Vin)$ times larger than that of the outside bus.

Power consumption is as follows:

$$P1 = Pmax - Plogic - Pmemory$$

$$P2 = Pmax - Plogic \qquad (3)$$

where Pmax is maximum power consumption bearable by a package, Plogic is power consumption of a logic part, and Pmemory is power consumption of a memory part.

$$P1/(Cin \times Vin \times Vin) > Fin \times Bin > P2/(Cex \times Vex \times Vex) \qquad (4)$$

If the expression (4) is true, it is impossible to form a bus having a band width of Fin×Bin outside a chip.

In this case, it must be formed inside the chip. Although the embodiment forms the pre-process part 13 in the processor unit 1, it may be formed in the GPU 3.

A method of providing a display with color information from the frame buffer is the same as that of the prior art.

Figure 9:
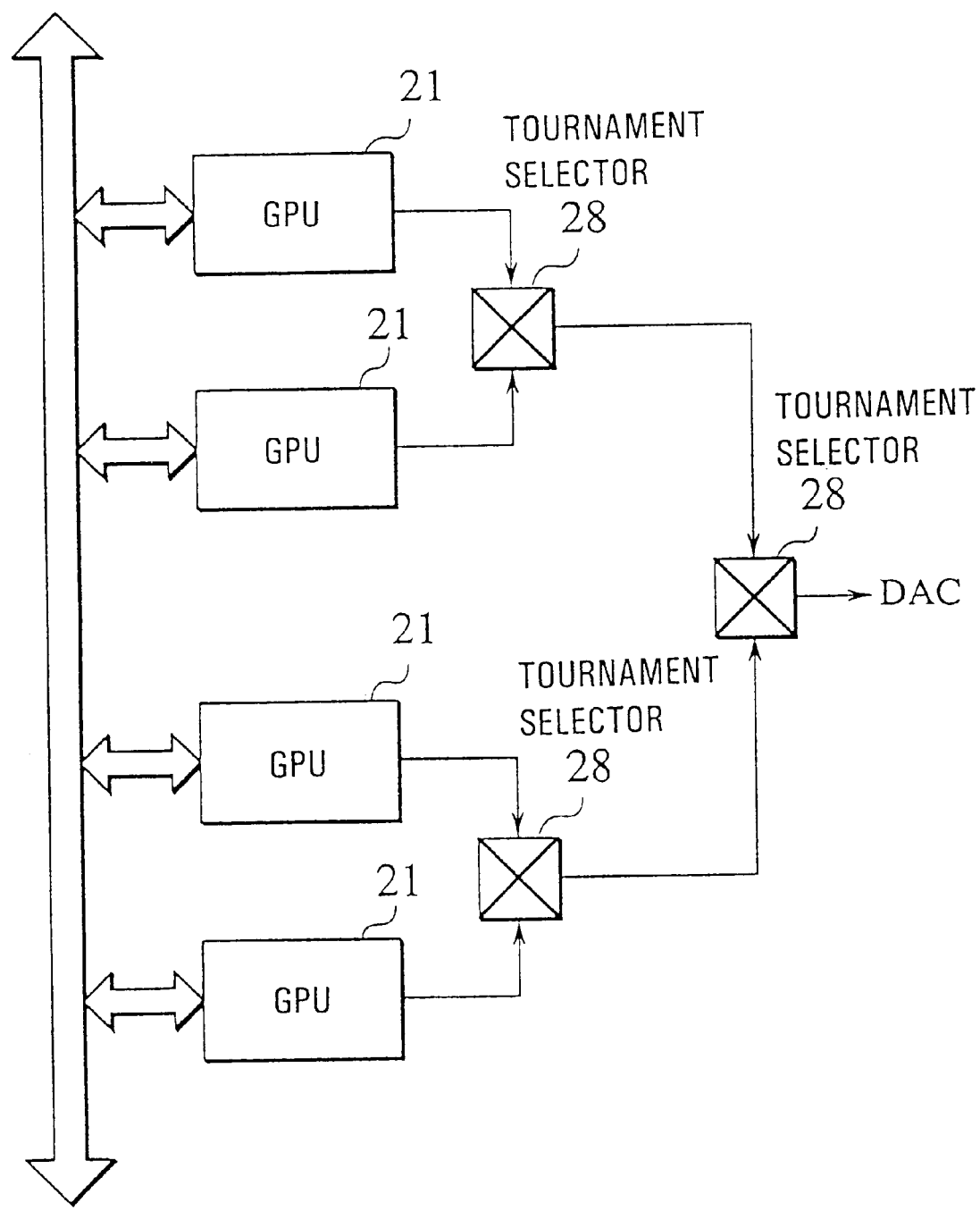
FIG. 9 shows an information processing apparatus employing GPUs according to a second embodiment of the present invention.

FIG. 9 shows a novel information processing apparatus having a plurality of DRAM ASIC GPUs 21 according to the second embodiment. This apparatus employs a tournament technique.

Each of the GPUs 21 is formed on a separate chip, and they are connected to a main bus 27. A CPU distributes graphics tasks to the GPUs 21. Although the output of each GPU 21 is indicated with a single line for the sake of simplicity, it has a width of several bytes as will be explained later.

The outputs of the GPUs 21 are multiplexed into a single image signal according to the tournament technique.

Figure 10:
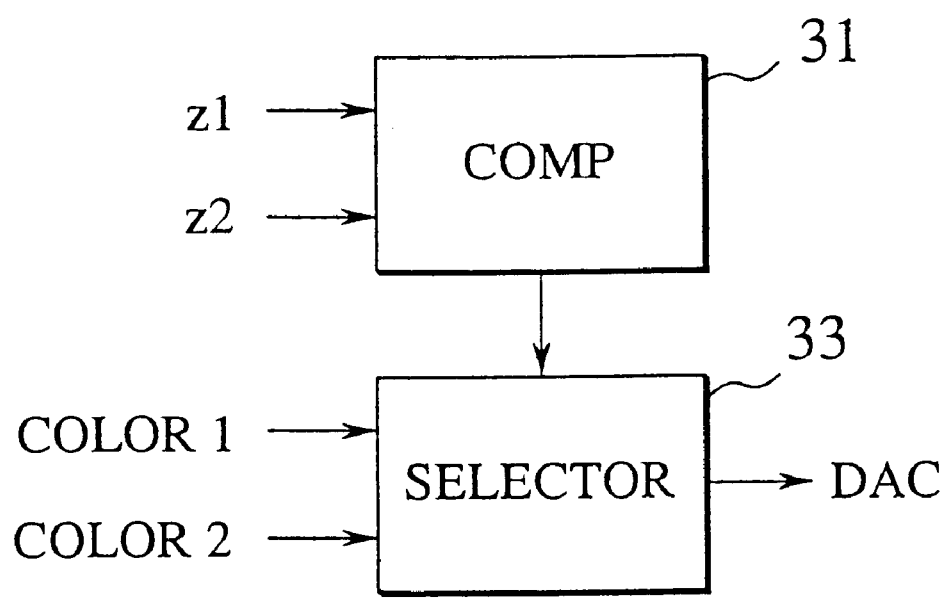
FIG. 10 shows a tournament selector of the apparatus of FIG. 9.

When α-values are not considered and when one of two outputs is selected, one having a smaller z-value indicating a shallower depth is selected. FIG. 10 shows a tournament selector 28 of FIG. 9.

The tournament selector 28 is arranged at each node of a tournament scheme of the GPUs 21. The tournament selector 28 consists of a comparator 31 and a selector 33. The comparator 31 compares two z-values z1 and z2 with each other and provides a signal indicating one of them that is in front of the other. According to the signal, the selector 33 selects a front one of color information pieces.

Figure 11:
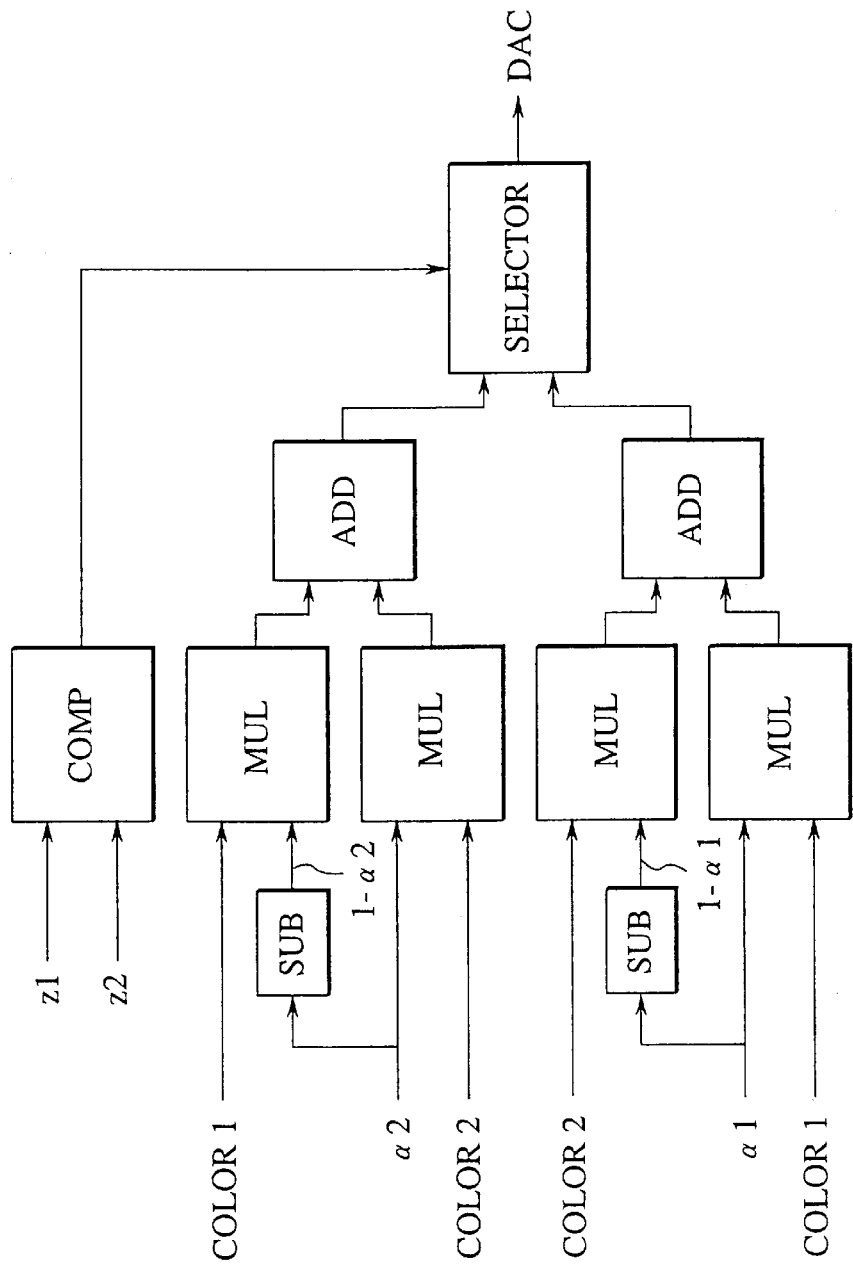
FIG. 11 shows a tournament selector employing α-values of the apparatus of FIG. 9.

FIG. 11 shows a tournament selector employing α-values. Each α-value ($0 <= \alpha <= 1$) indicates transparency used for blending colors. When the α-values are used, pairs of selector-multipliers are employed. If, for example, z1<z2, a subtracter SUB, multipliers MULs, and an adder ADD are used to provide color $1 \times \alpha + $ color $2 \times (1-\alpha)$.

Figure 12:
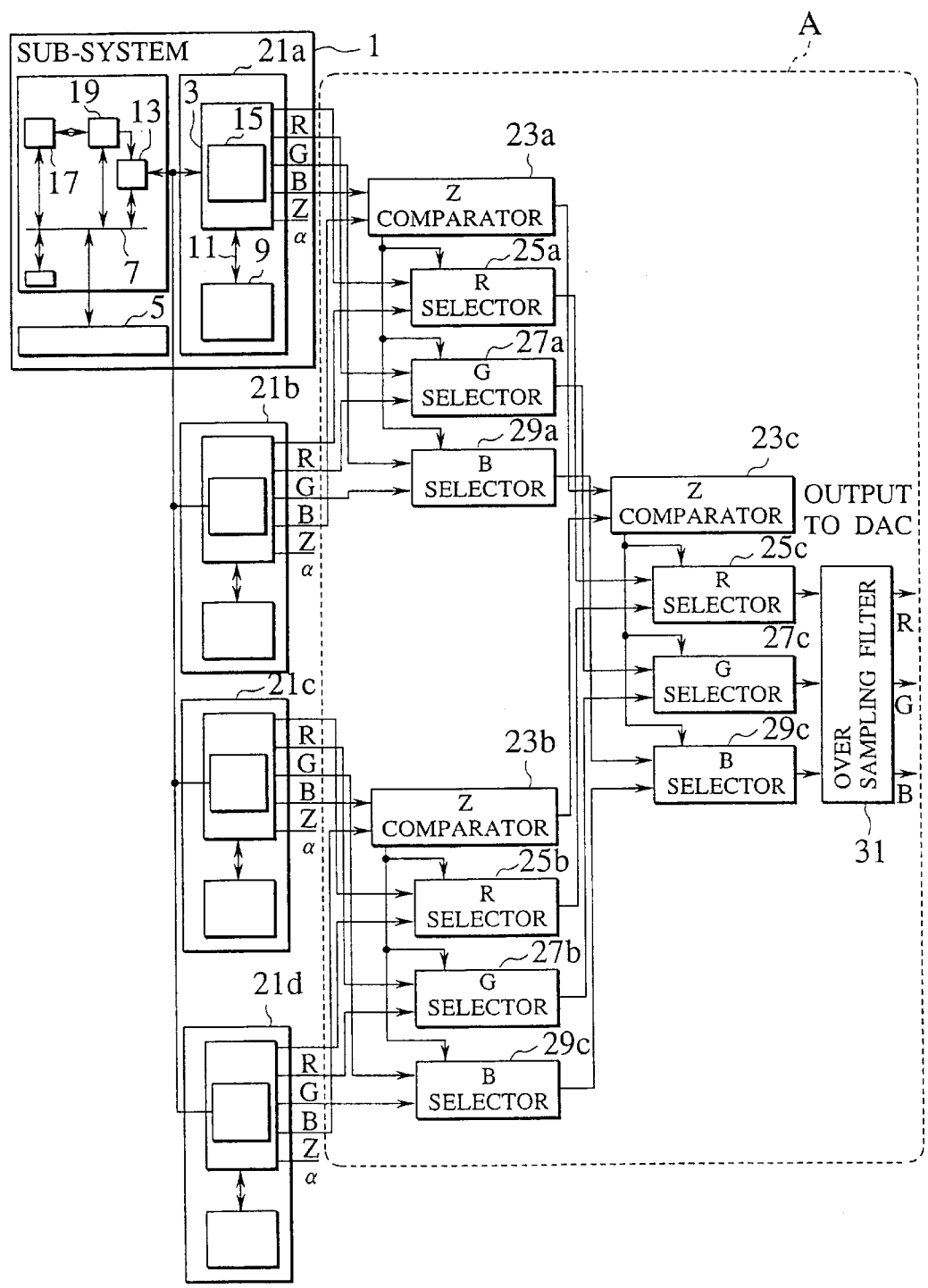
FIG. 12 shows the details of the apparatus of FIG. 9.

FIG. 12 shows the details of the second embodiment of FIG. 9.

The apparatus has a processor unit 1 and the four DRAM ASIC GPUs 21a to 21d. The outputs of the GPUs are supplied to a tournament selector circuit A, and final outputs are selected among them through a tournament. The number of the GPUs connected in parallel is not limited to four. The topology of the tournament selector circuit A is adjusted to the number of the GPUs. The most effective topology is realized when the number of the GPUs is a power or multiple of 2.

Employing a plurality of GPUs is particularly effective when the total performance of the information processing apparatus shows no improvement even with the processor unit 1 having a high program executing speed and a high coordinate translating speed.

The operation of the embodiment of FIG. 12 will be explained.

A z-comparator 23a receives z-values from the GPUs 21a and 21b and determines which one of them is valid, for example, which one of them is closer to a view point than the other. The valid one is informed to an r-selector 25a, a g-selector 27a, and a b-selector 29a, which provide valid r-, g-, and b-values. The z-, r-, g-, and b-values are supplied to a z-comparator 23c, an r-selector 25c, a g-selector 27c, and a b-selector 29c, respectively.

Similarly, a z-comparator 23b receives z-values from the GPUs 21c and 21d and determines which one of them is valid. The valid one is informed to an r-selector 25b, a g-selector 27b, and a b-selector 29b, which provide valid r-, g-, and b-values. The z-, r-, g-, and b-values are supplied to the z-comparator 23c, r-selector 25c, g-selector 27c, and b-selector 29c, respectively.

The z-comparator 23c determines a valid one of the z-values. According to the valid one, the r-selector 25c, g-selector 27c, and b-selector 29c provide final values.

If antialiasing by over-sampling is required on the final values, a filter 31 is added to provide an average of a plurality of pixels for each color.

In this way, the present invention employs a plurality of GPUs each having a graphics memory and combines the outputs thereof just before providing display data. This solves the problem of the memory bus of the prior art and improves the performance of the information processing apparatus.

Figure 13:
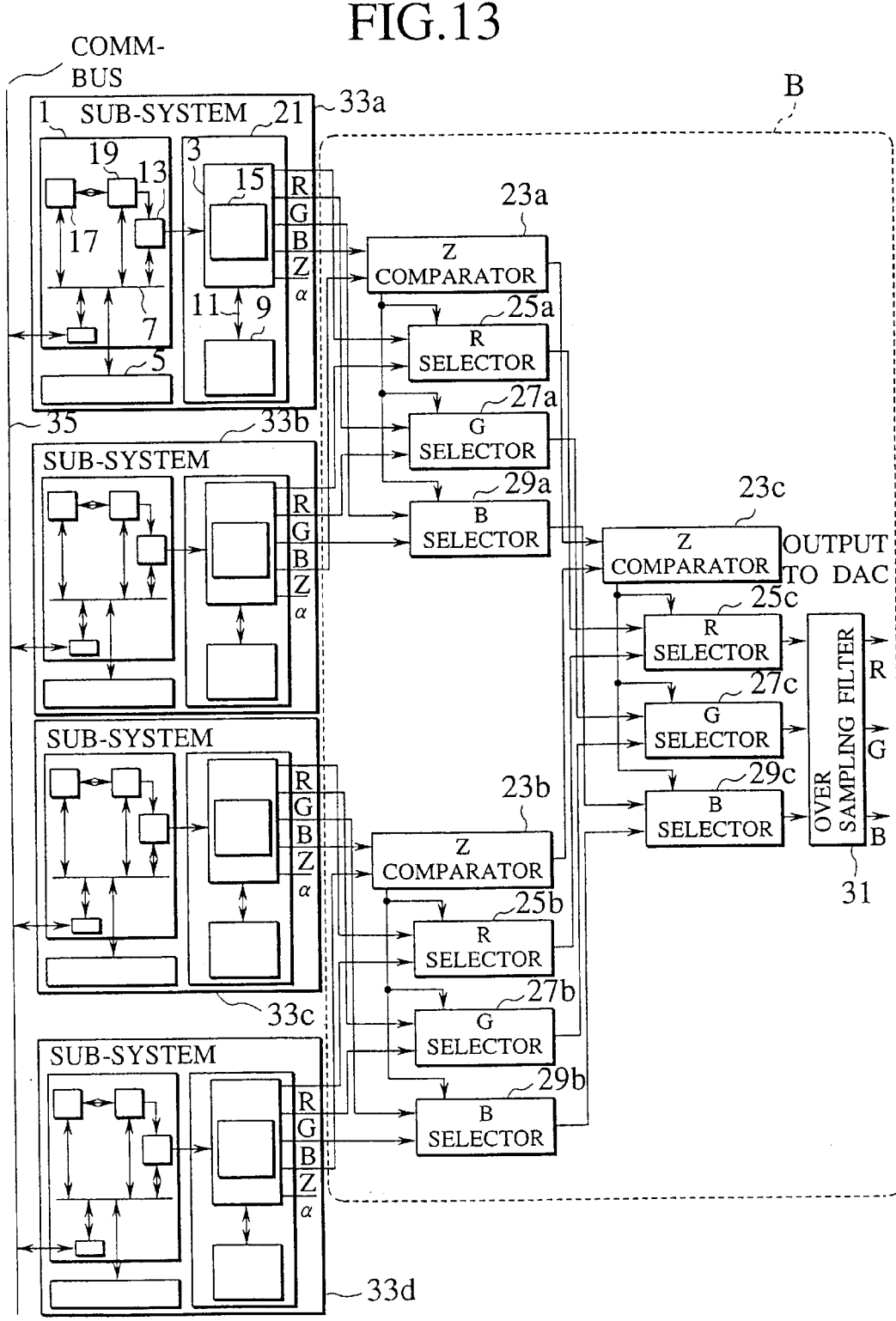
FIG. 13 shows an information processing apparatus employing GPUs according to a third embodiment of the present invention.

FIG. 13 shows an information processing apparatus employing multiple GPUs according to the third embodiment of the present invention. This embodiment employs a plurality of not only DRAM ASIC GPUs 21 but also processor units 1 and main memories 5. Namely, this embodiment is a multi-processor system. The processor unit 1, main memory 5, and DRAM ASIC GPU 21 form a sub-system. The system of FIG. 13 has four sub-systems 33a to 33d.

The multi-processor system is capable of dealing with heavy graphics tasks at high speed dependent on the number of the sub-systems.

The operation of the embodiment of FIG. 13 will be explained.

A tournament selector circuit B selects the outputs of the sub-systems 33a to 33d through a tournament similar to the tournament selector circuit A of FIG. 12 selecting the outputs of the GPUs 21a to 21d. The arrangement and topology of the circuit B are the same as those of the circuit A of FIG. 12.

The sub-systems 33a to 33d have a communication means 35 for synchronization. The means 35 may be a dedicated bus or a general communication bus such as a GPIB.

Figure 14:
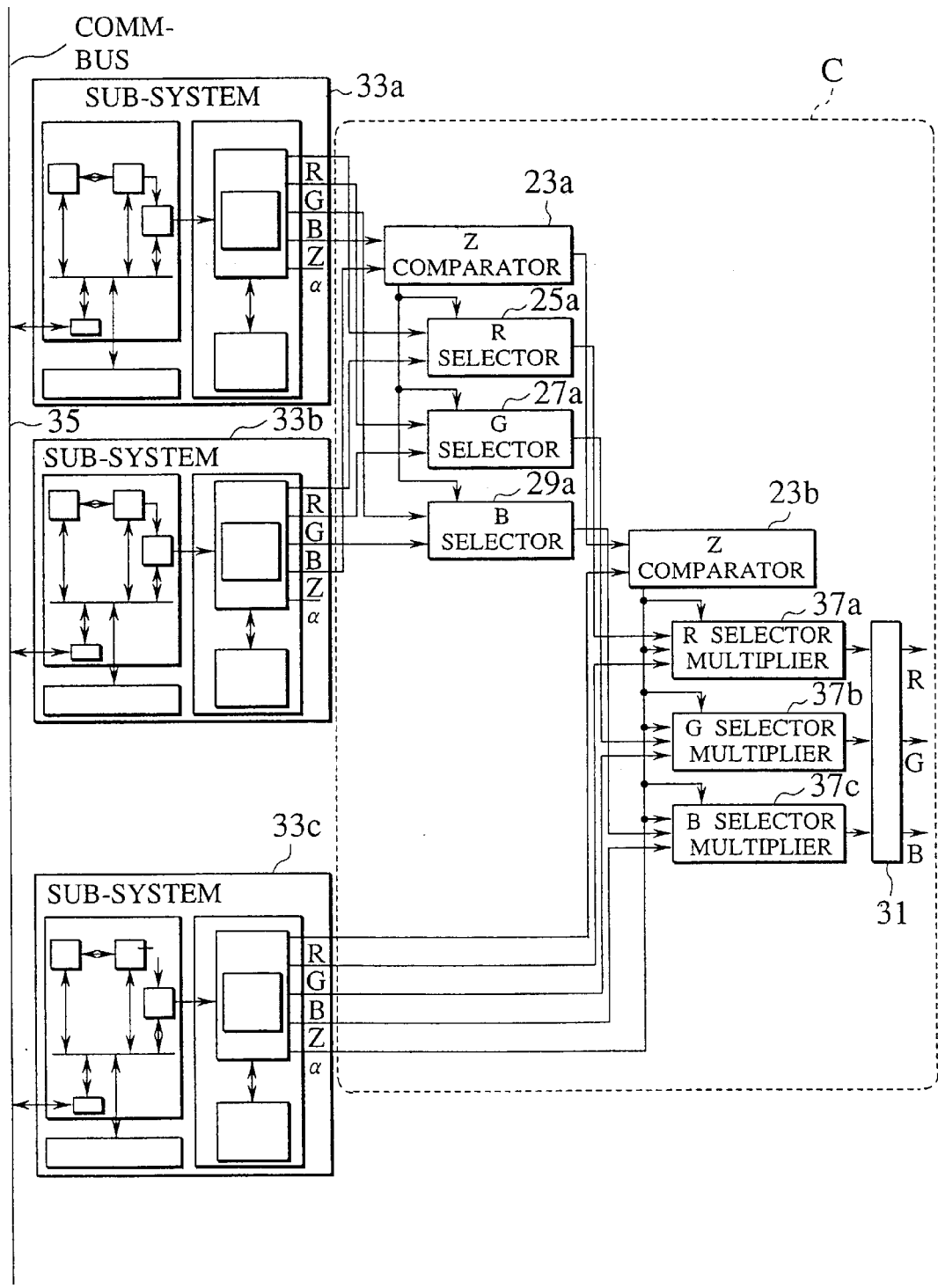
FIG. 14 shows an information processing apparatus based on the apparatus of FIG. 13, capable of carrying out α blending.

FIG. 14 shows an information processing apparatus based on the apparatus of FIG. 13 and additionally having a function of a blending.

A sub-system 33c carries out only rendering with α blending. Usual outputs without α blending from a z-comparator 23a, an r-selector 25a, a g-selector 27a, and a b-selector 29a and the z-, r-, g-, b-, and α-outputs of the sub-system 33c are synthesized by a z-comparator 23b, an r-selector-multiplier 37a, a g-selector-multiplier 37b, and a b-selector-multiplier 37c.

The z-comparator 23b determines a valid one of the usual and α blending outputs. According to the valid one, the r-selector-multiplier 37a, g-selector-multiplier 37b, and b-selector-multiplier 37c provide final values. If antialiasing by over-sampling is required on the final values, a filter 31 is added to provide an average of a plurality of pixels for each color.

Figure 15:
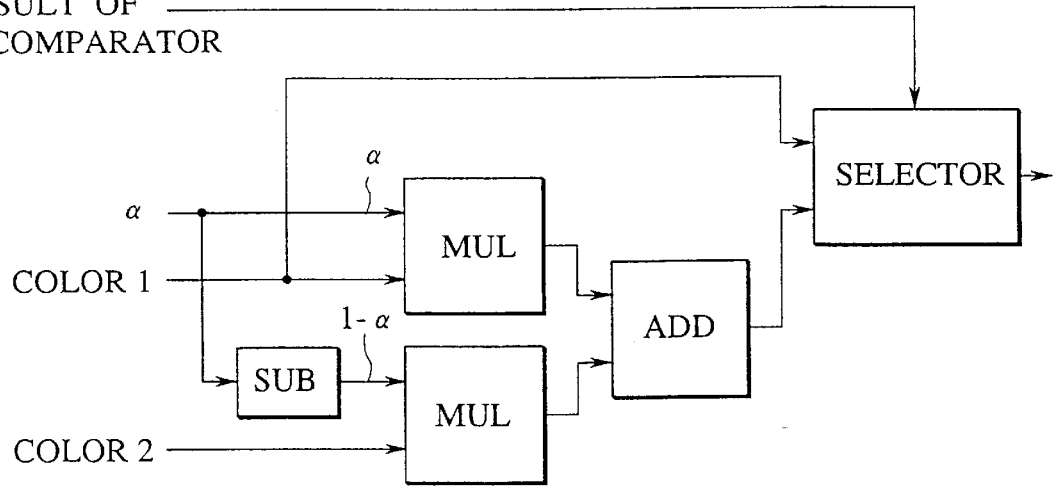
FIG. 15 shows selector-multipliers of the apparatus of FIG. 14.

FIG. 15 shows an example of any one of the selector-multipliers. If a usual rendering output is valid, the r-selector-multiplier 37a, g-selector-multiplier 37b, and b-selector-multiplier 37c provide each a usual rendering output, i.e., color 1. If an α blending output is valid, the usual rendering output and α blending output are blended, and an output of color 1×α+color 2×(1−α) is provided.

The embodiment of FIG. 14 employs two usual rendering sub-systems 33a and 33b. There may be four usual rendering sub-systems as shown in FIG. 13. The number of the sub-systems is optional.

In summary, the present invention forms a GPU and a graphics memory on a single chip, to secure a wide band width in a graphics bus.

Figure 16:
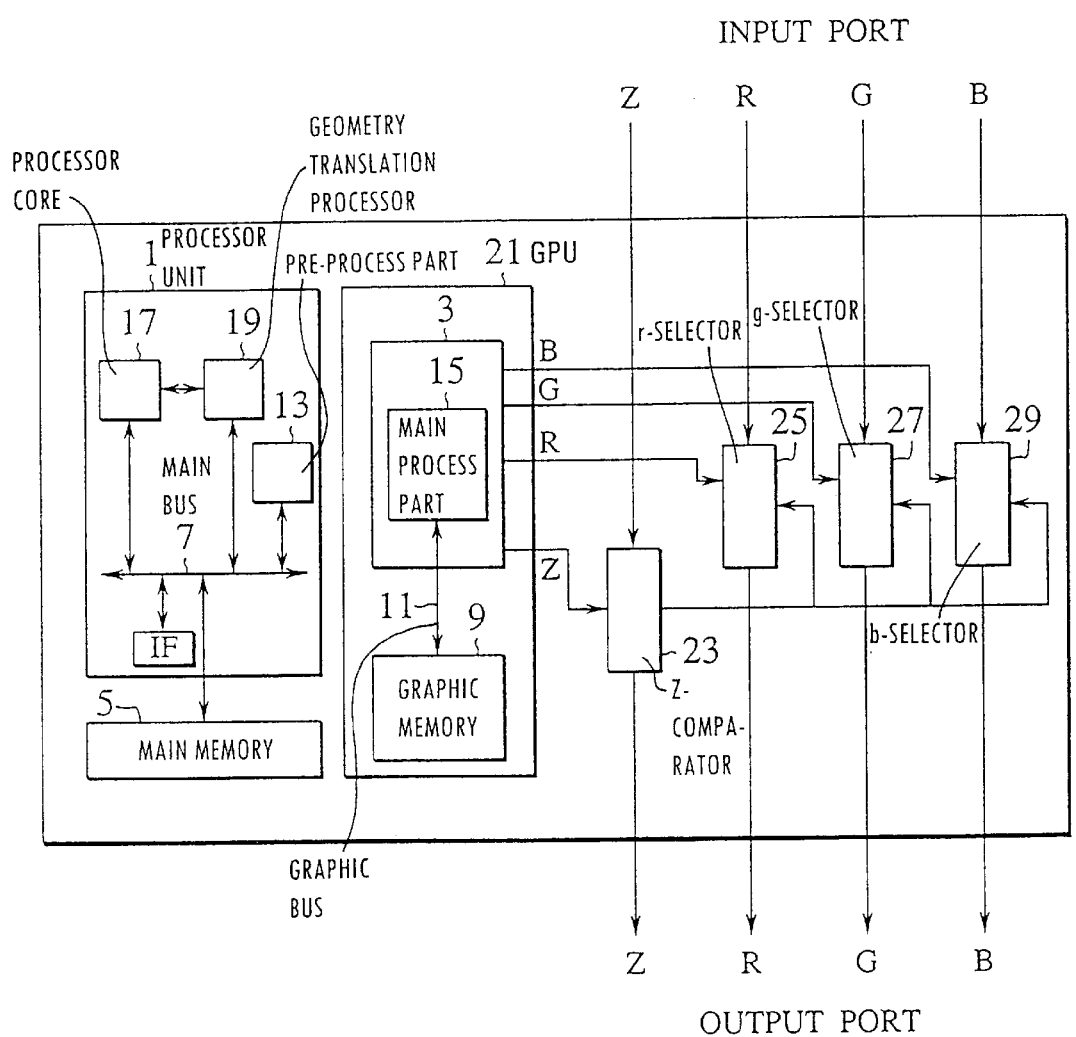
FIG. 16 shows one sub-system of an information processing apparatus implemented in a multi-processor system according to the fourth embodiment.

FIG. 16 shows one sub-system of an information processing apparatus implemented in a multi-processor system according to the fourth embodiment.

The sub-system is provided with a processor unit 1, a DRAM ASIC GPU 21 and a main memory 5, in the same manner as the first embodiment illustrated in FIG. 8. While these constituents elements have the same structures and functions of the previous embodiment, detailed explanation is not repeated.

Figure 17:
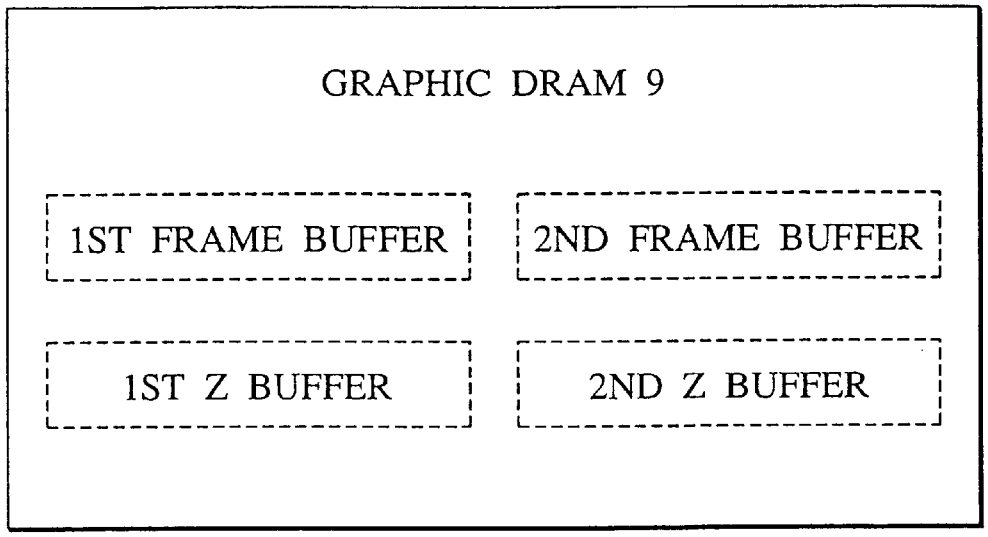
FIG. 17 shows a graphic DRAM consisting of a first frame buffer area, a first z buffer area, a second frame buffer area and a second z buffer area.

In the case that the double buffering technique is employed, defined in the graphic memory 9 of the DRAM ASIC GPU 21 are a first frame buffer area, a first z buffer area, a second frame buffer area and a second z buffer area as illustrated in FIG. 17.

However, in accordance with the fourth embodiment, a z-comparator 23, an r-selector 25, a g-selector 27, and a b-selector 29 are implemented respectively within each sub-system. The sub-system is provided with an image signal receiving port for receiving R, G, B and z-values and an image signal outputting port for outputting R, G, B and z-values as selected by the z-comparator 23, the r-selector 25, the g-selector 27, and the b-selector 29 in accordance with the z-value.

Figure 18:
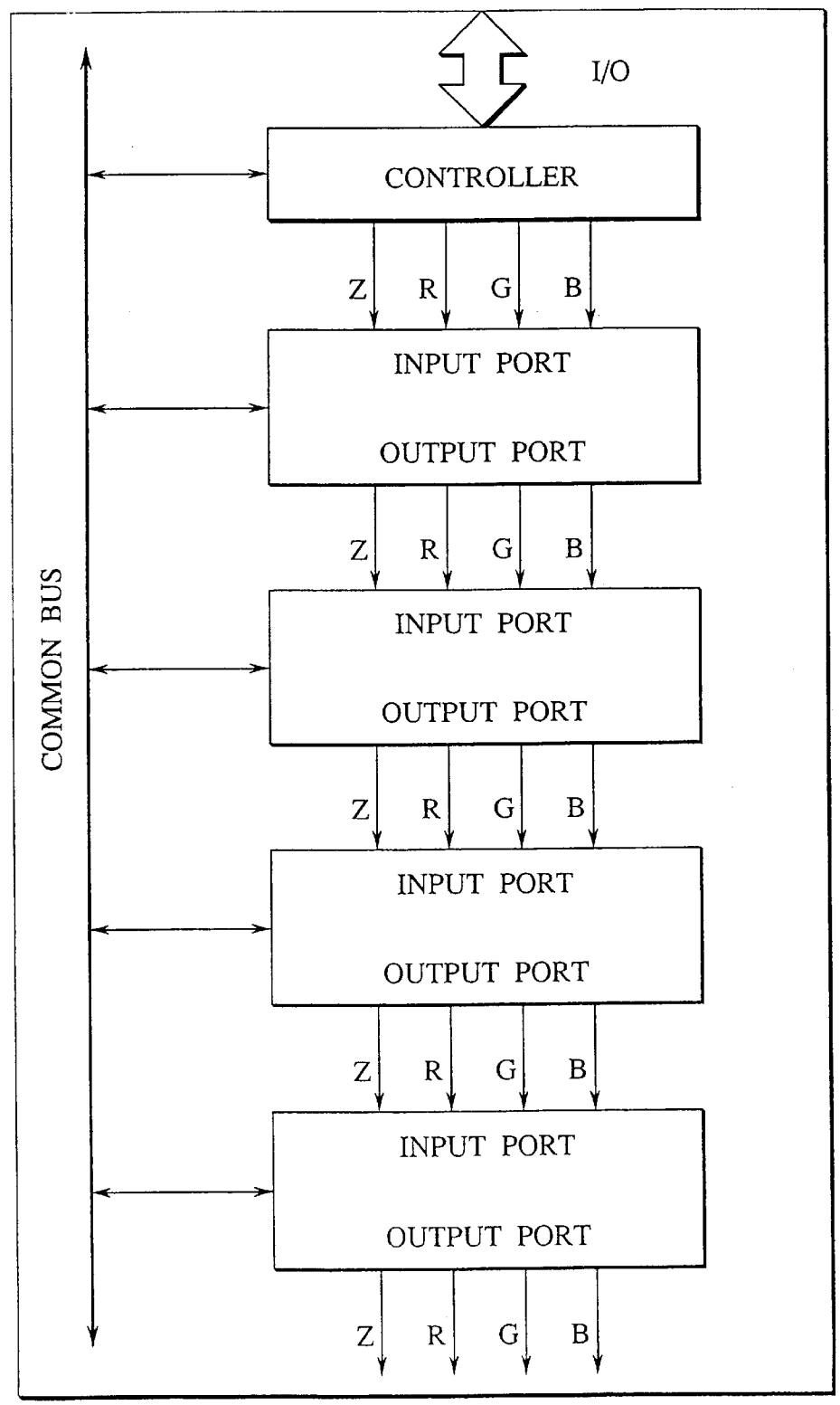
FIG. 18 shows a plurality of the sub-systems connected in series to each other in the form of a cascade.

In accordance with the fourth embodiment, a plurality of the sub-systems are connected in series to each other in the form of a cascade as illustrated in FIG. 18. One sub-system receives the R, G, B and z-values from a previous sub-system in the upstream side thereof through the image signal receiving port and outputs either of the R, G, B and z-values from the previous sub-system or the R, G, B and z-values generated from that sub-system in accordance with the comparison result of the z-values.

On the other hand, in accordance with the fourth embodiment, a plurality of the sub-systems are connected to a controller through a common bus as illustrated. The controller receives command data from an external device, such as a Joystick of a video game machine in which the graphic system in accordance with the present invention is operated, and broadcasts the command data generated in response to manipulation by a player to the graphic sub-systems respectively through the common bus.

The image signal receiving port of the first sub-system at the most upstream position are ground. In this case, the ground level of the z-value is assumed to represent the hindmost position so that the R, G, B and z-values of the first sub-system is always output to the image signal outputting port thereof.

The output signals of the last sub-system is transferred to a DAC. If antialiasing by over-sampling is required on the final values, a filter may be added to provide an average of a plurality of pixels for each color. The achievement of the information processing apparatus is therefore equivalent to that of the third embodiment of the present invention as illustrated in FIG. 13.

The multi-processor system is therefore capable of dealing with heavy graphics tasks at high speed dependent on the number of the sub-systems. However, in this case, there are significant further advantages from the practical view point. Namely, the design of the whole system can be easily modified in order to improve the performance by increasing the number of the sub-systems available. For example, while a circuit main board is prepared with four patterns on each of which accommodates one sub-system, 1 to 4 unit can be actually mounted in accordance with the allowable cost and the required performance.

Figure 19:
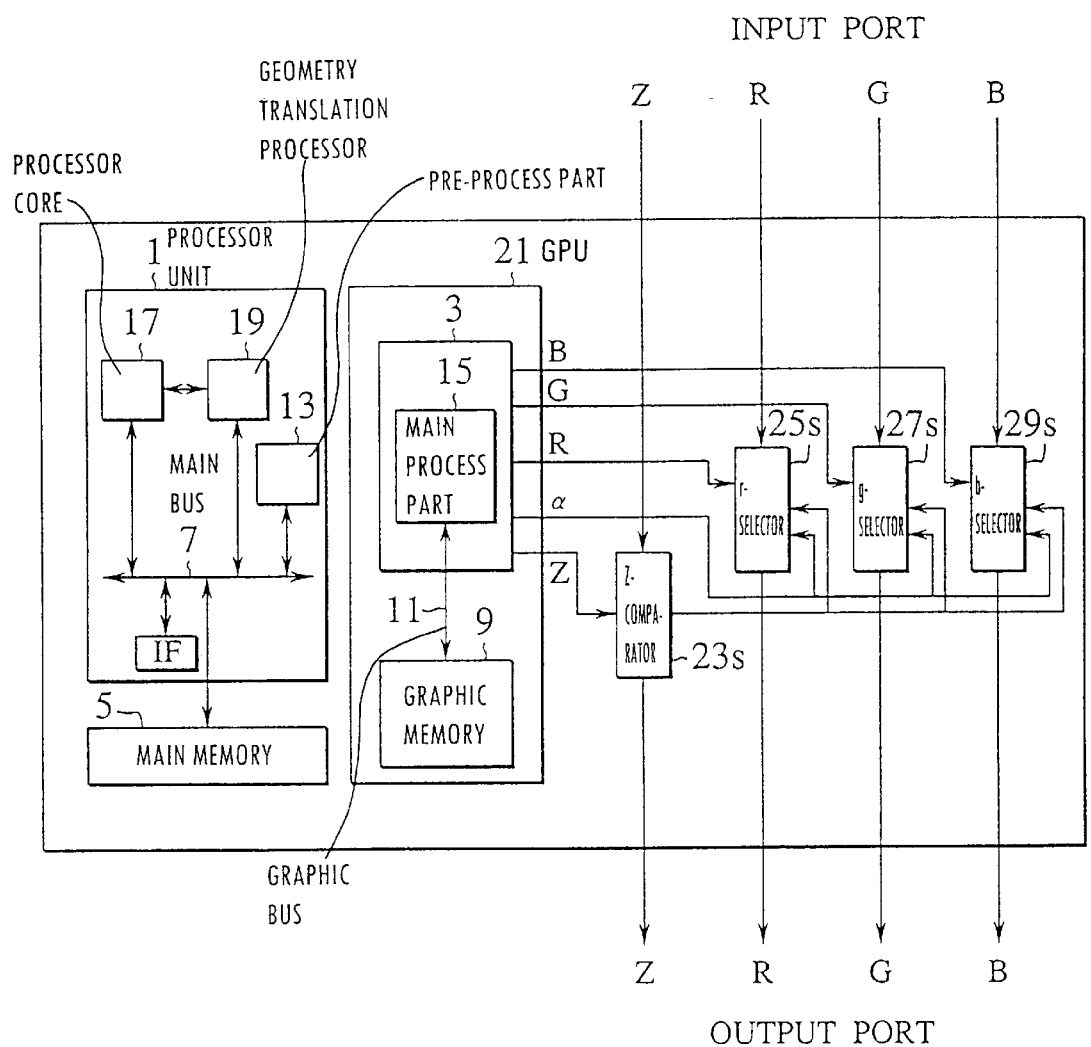
FIG. 19 shows one sub-system of an information processing apparatus implemented in a multi-processor system according to the fifth embodiment.

FIG. 19 shows one sub-system of an information processing apparatus implemented in a multi-processor system according to the fifth embodiment.

The sub-system of this type is also provided with a processor unit 1, a DRAM ASIC GPU 21 and a main memory 5, in the same manner as the first embodiment illustraOted in FIG. 8. While these constituents elements have the same structures and functions of the previous embodiment, detailed explanation is not repeated.

However, in accordance with the fifth embodiment, a z-comparator 23, a r-selector-multiplier 25s, a g-selector-multiplier 27s, and a b-selector-multiplier 29s are implemented within the sub-system. The sub-system is provided with an image signal receiving port for receiving R, G, B and z-values and an image signal outputting port for outputting R, G, B and z-values as treated by the z-comparator 23s, the r-selector-multiplier 25s, the g-selector-multiplier 27s, and the b-selector-multiplier 29s in accordance with the z-value and the α value.

Figure 20:
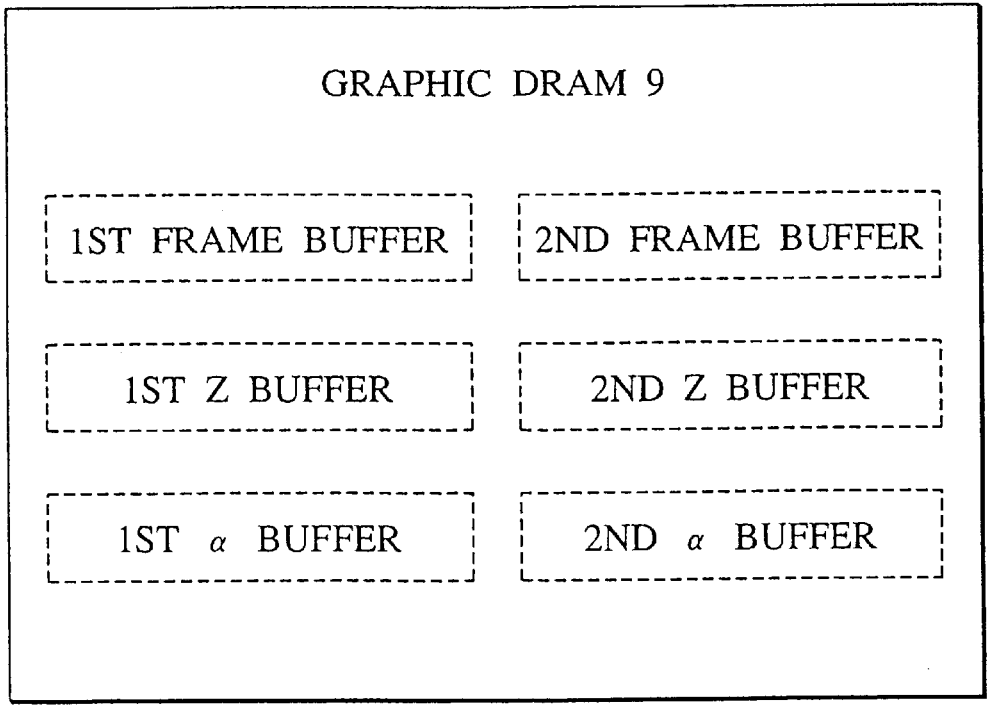
FIG. 20 shows a graphic DRAM consisting of a first frame buffer area, a first z buffer area, a first α buffer area, a second frame buffer area, a second z buffer area, and a second α buffer area.

In the case that the double buffering technique is employed, defined in the graphic memory 9 of the DRAM ASIC GPU 21 are a first frame buffer area, a first z buffer area, a first α buffer area, a second frame buffer area, a second z buffer area, and a second α buffer area as illustrated in FIG. 20.

Also in accordance with the fifth embodiment, a plurality of the sub-systems are connected in series to each other in the form of a cascade as illustrated in FIG. 18. One sub-system receives the R, G, B and z-values from a previous sub-system in the upstream side thereof through the image signal receiving port and outputs blended signal of the R, G, B and z-values from the previous sub-system and the R, G, B and z-values generated from that sub-system in accordance with the α value and the comparison result of the z-values.

The image signal receiving port of the first sub-system at the most upstream position are ground. In this case, the ground level of the z-value is assumed to represent the hindmost position so that the R, G, B and z-values of the first sub-system is always output to the image signal outputting port thereof. In this case, the α value of the first sub-system at the most upstream is fixed to one indicative of completely not-transparency.

The output signals of the last sub-system is transferred to a DAC. If antialiasing by over-sampling is required on the final values, a filter may be added to provide an average of a plurality of pixels for each color. The achievement of the information processing apparatus is therefore equivalent to that of the embodiment of the present invention as illustrated in FIG. 14.

Also, in this case, the multi-processor system is capable of dealing with heavy graphics tasks at high speed dependent on the number of the sub-systems. There are significant advantages from the practical view point. Namely, the design of the whole system can be easily modified in order to improve the performance by increasing the number of the sub-systems available.

The multi-processor systems in accordance with the present invention as illustrated in FIG. 18 make it possible to provide a unique programming environment which has been introduced for the first time by the inventor. In the novel programming environment, a graphical program can be implemented in two separate modules in general. The same or partly same program can be stored in the main memory of each of the sub-systems as explained in the following description.

The main module of the graphical program consists of routines and functions for mathematical calculations required to determine the three dimensional moving geometrical data to be displayed. The other display module of the graphical program consists of routines and functions for mathematical calculations required to obtain a two-dimensional view to be actually displayed on a monitor.

The mathematical calculations performed in the main module of the graphical program are independent of the actual graphic two-dimensional view as displayed in a monitor. In accordance with the present invention, each of the sub-systems is equally treated as compared with the others so that the main module is running in each of the sub-systems during operation. This redundant execution is important from the practical view point, because the same program can be prepared and stored commonly in the main memory of each of the sub-systems. The hardware and the software of the system becomes significantly simplified, irrespective of the number of the sub-systems as used.

The mathematical calculations performed in the display module of the graphical program are different in different sub-systems. However, a plurality of sub-modules can be prepared for a plurality of the sub-systems in accordance with the roles of the respective sub-systems. In the case that a single code image are formed commonly in the main memories of the sub-systems, each of the sub-systems makes use only of its sub-module by discriminating the ID of that sub-system. The ID may be implemented, for example, by differentiating the pattern where each of sub-systems is mounted without differentiating the configuration of the sub-system. Alternatively, the main module and only the sub-module responsible to each sub-system is stored in said each sub-system.

For example, the multi-processor systems in accordance with the present invention may be utilized for implementing a three-dimensional video game machine. In this case, the motion characters and the background can be assigned to the two sub-systems. The main module of the graphical program is designed in accordance with the story of the game. On the other hand, the display module of the graphical program is designed, for example, to prepare the bird's-eye view of the geographical data as prepared by the main module of the graphical program with respect to the motion characters or the background view. One of the two sub-systems is responsible for drawing the motion characters while the other sub-system is responsible for drawing the background view.

When the video speed is not sufficient, each motion characters can be assigned to one sub-system by increasing the number of the sub-systems. In this case, the cascade of the sub-systems as illustrated in FIGS. 18 and 19 is simply elongated without substantial modification on the design while the display sub-module of the graphical program relating to the motion characters are separated into a plurality of sub-modules for the respective characters without modification of the main module thereof. The system extension therefore becomes substantially easy.

Figure 21:
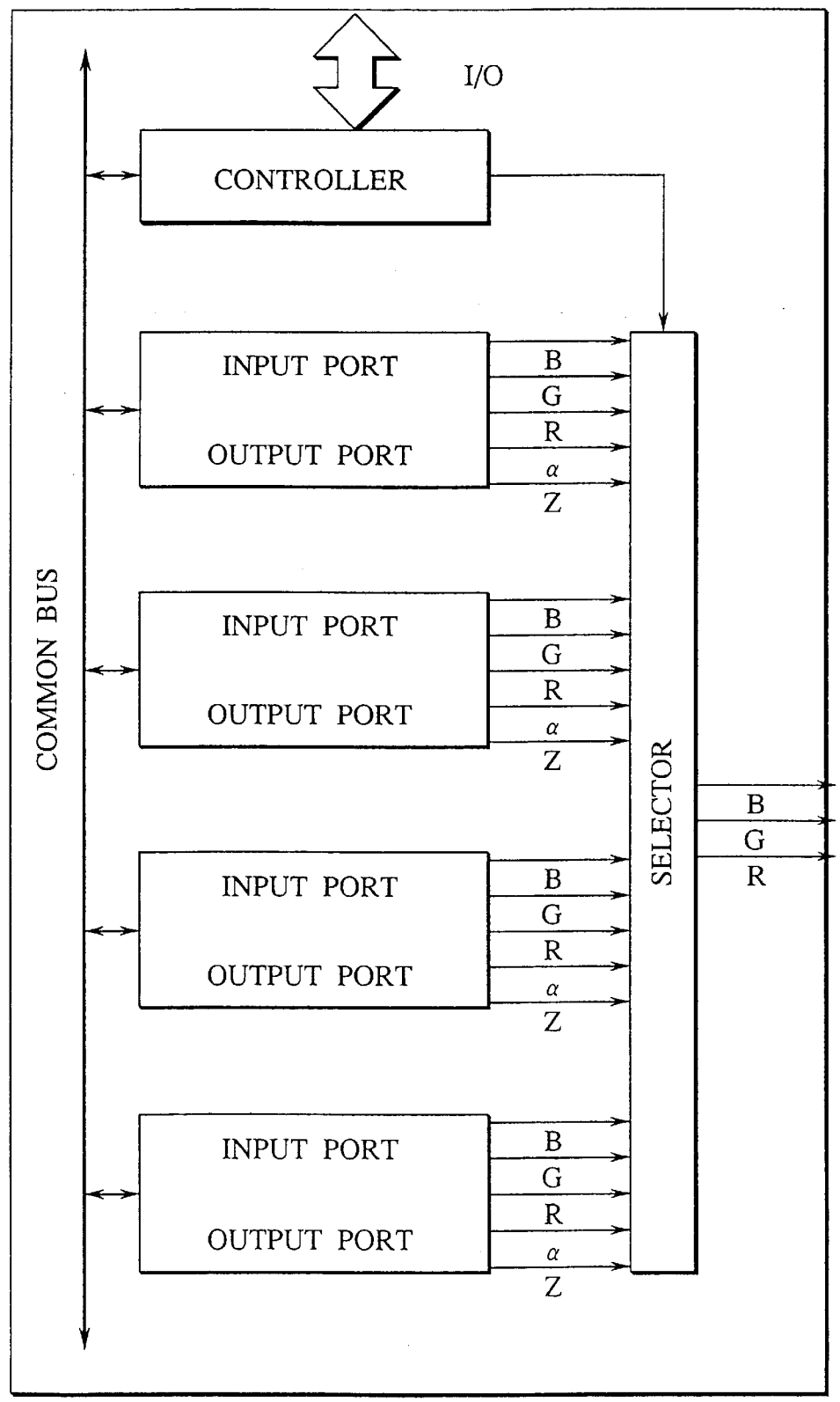
FIG. 21 shows an information processing apparatus implemented in a multi-processor system according to the sixth embodiment.
Figure 22:
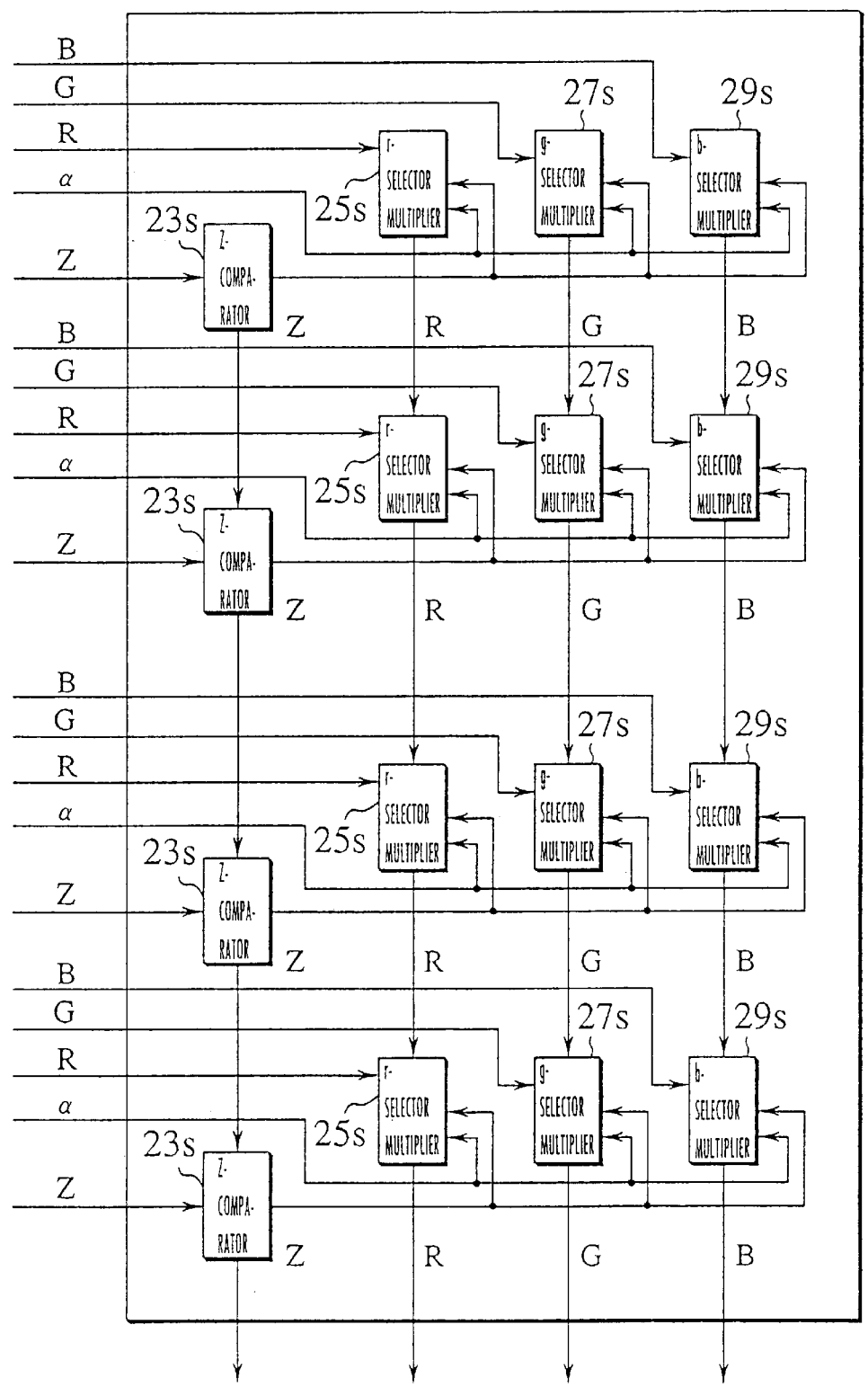
FIG. 22 shows a single selector circuit block of the information processing apparatus according to the sixth embodiment in which a z-comparator, a r-selector-multiplier, a g-selector-multiplier, and a b-selector-multiplier of each sub-system are implemented collectively.
Figure 23:
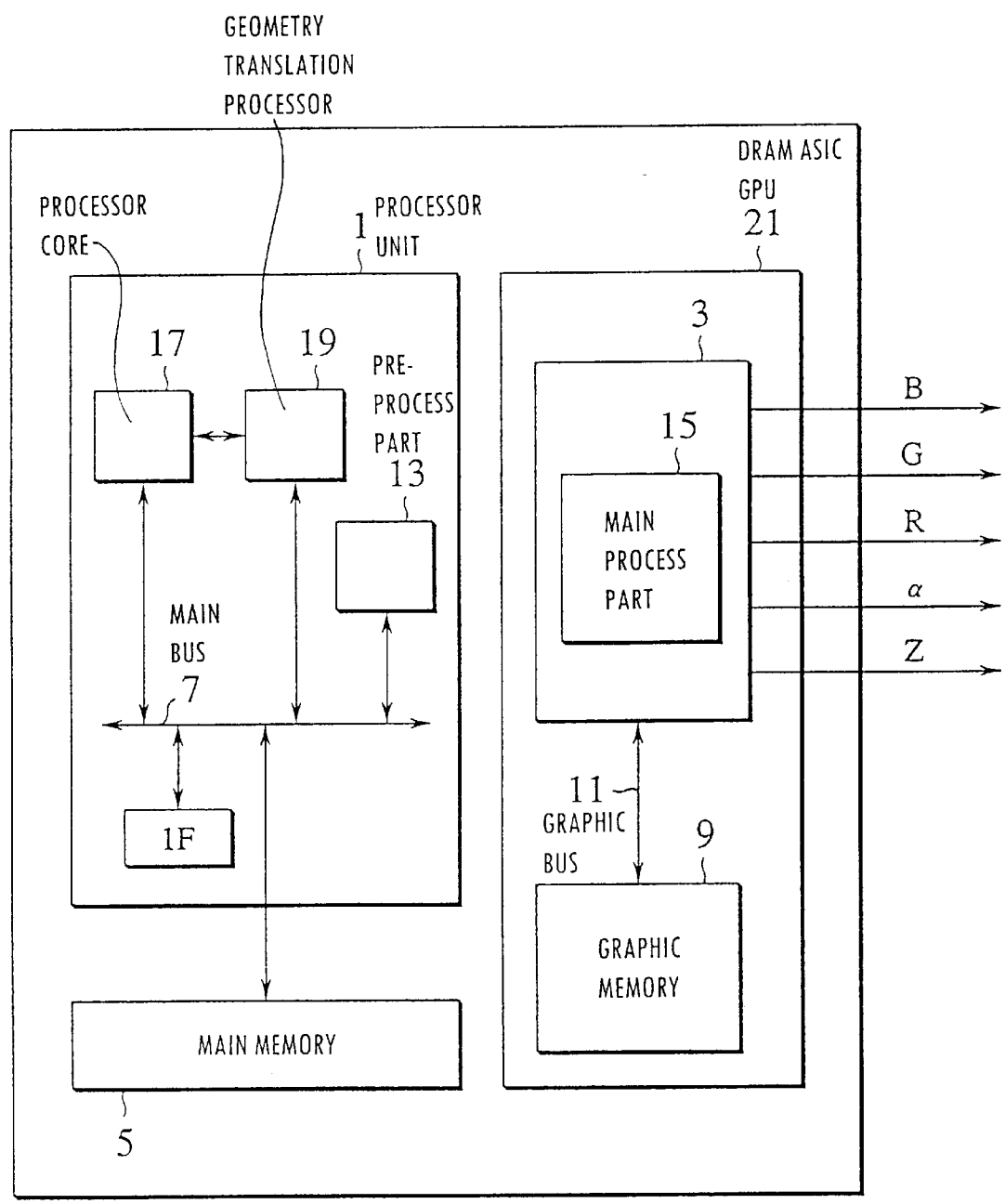
FIG. 23 shows one sub-system of an information processing apparatus implemented in a multi-processor system according to the sixth embodiment.

FIG. 21 shows an information processing apparatus implemented in a multi-processor system according to the sixth embodiment. Four sub-systems are connected with a controller through a common bus in the same manner as the fifth embodiment. The sub-system is provided with a processor unit 1, a DRAM ASIC GPU 21 and a main memory 5 as illustrated in FIG. 23 in the same manner as the fourth embodiment. However, in accordance with the sixth embodiment, a z-comparator 23, a r-selector-multiplier 25s, a g-selector-multiplier 27s, and a b-selector-multiplier 29s of each sub-system are implemented respectively within a single selector circuit block, as illustrated in FIG. 22, which is designed separated from the sub-systems.

The present invention provides an information processing apparatus employing multiple GPUs each provided with a dedicated graphics memory, to realize a high-speed operation. Since a pair of the GPU and graphics memory is formed on a separate chip, the cost is reduced and an operation speed is improved.

What is claimed is:

1. An information processing apparatus comprising:
    (a) a processor unit configured to execute a graphical program;
    (b) a main memory configured to communicate with said processor unit, and to store said graphical program and graphical data for use in executing said graphical program;
    (c) first, second, third and fourth graphic circuits, each graphic circuit comprising a graphic processor unit and a graphic memory,
        each said graphic processor unit configured to communicate with said processor unit, and to output video data and depth coordinate Z value,
        each said graphic memory configured to communicate with said corresponding graphic processor;
    (d) a first Z-comparator configured to receive two depth coordinate Z values from said first and second graphic circuits, and to compare the two depth coordinate Z values from said first and second graphic circuits;

(e) a first selector configured to receive two video data from said first and second graphic circuits, and to select one of the video data in accordance with a result of comparison of the two depth coordinate Z values by said first Z-comparator;

(f) a second Z-comparator configured to receive two depth coordinate Z values from said third and fourth graphic circuits, and to compare the two depth coordinate Z values from said third and fourth graphic circuits;

(g) a second selector configured to receive two video data from said third and fourth graphic circuits, and to select one of the video data in accordance with a result of comparison of the two depth coordinate Z values by said second Z-comparator;

(h) a third Z-comparator configured to receive two depth coordinate Z values from said first and second Z-comparators, and to compare the two depth coordinate Z values from said first and second Z-comparators; and (i) a third selector configured to receive two video data from said first and second selectors, and to select one of the video data in accordance with a result of comparison of the two depth coordinate Z values by said third Z-comparator.

2. The information processing apparatus claimed in claim 1, wherein said third selector further is configured to receive a degree of transparency α1 from said first selector and a degree of transparency α2 from said second selector, and to execute first and second calculations:

$$D1*(1-\alpha2)+D2*\alpha2$$

$$D2*(1-\alpha1)+D1*\alpha1$$

where D1 denotes the video data from said first selector and D2 denotes the video data from said second selector, and selecting one of the first and second calculation results in accordance with the result of comparison of the two depth coordinate Z values by said third Z-comparator.

3. An information processing apparatus comprising:
(a) first, second, third and fourth sub-systems, each sub-system comprising:
a processor unit configured to execute a graphical program,
a main memory configured to communicate with said corresponding processor unit, and to store said graphical program and graphical data for use in executing said graphical program,
a graphic processor unit configured to communicate with said corresponding processor unit, and to output video data and depth coordinate Z value,
a graphic memory configured to communicate with said corresponding graphic processor;
(b) a first Z-comparator configured to receive two depth coordinate Z values from said first and second sub-systems, and to compare the two depth coordinate Z values from said first and second sub-systems;
(c) a first selector configured to receive two video data from said first and second sub-systems, and to select one of the video data in accordance with a result of comparison of the two depth coordinate Z values by said first Z-comparator;

(d) a second Z-comparator configured to receive two depth coordinate Z values from said third and fourth sub-systems, and to compare the two depth coordinate Z values from said third and fourth sub-systems;

(e) a second selector configured to receive two video data from said third and fourth sub-systems, and to select one of the video data in accordance with a result of comparison of the two depth coordinate Z values by said second Z-comparator;

(f) a third Z-comparator configured to receive two depth coordinate Z values from said first and second Z-comparators, and to compare the two depth coordinate Z values from said first and second Z-comparators; and (g) a third selector configured to receive two video data from said first and second selectors, and to select one of the video data in accordance with a result of comparison of the two depth coordinate Z values by said third Z-comparator.

4. An information processing apparatus comprising:
(a) first and second sub-systems, each sub-system comprising:
a processor unit configured to execute a graphical program,
a main memory configured to communicate with said corresponding processor unit, and to store said graphical program and graphical data for use in executing said graphical program,
a graphic processor unit configured to communicate with said corresponding processor unit, and to output video data and depth coordinate Z value,
a graphic memory configured to communicate with said corresponding graphic processor;
(b) a third sub-system comprising:
a processor unit configured to execute a graphical program,
a main memory configured to communicate with said corresponding processor unit, and to store said graphical program and graphical data for use in executing said graphical program,
a graphic processor unit configured to communicate with said corresponding processor unit, and to output video data, depth coordinate Z value and a degree of transparency α,
a graphic memory configured to communicate with said corresponding graphic processor;
(c) a first Z-comparator configured to receive two depth coordinate Z values from said first and second sub-systems, and to compare the two depth coordinate Z values from said first and second sub-systems,
(d) a selector configured to receive two video data from said first and second sub-systems, and to select one of the video data in accordance with a result of comparison of the two depth coordinate Z values by said first Z-comparator;
(e) a second Z-comparator configured to receive two depth coordinate Z values from said first Z-comparator and said third sub-system, and to compare the two depth coordinate Z values from said first Z-comparator and said third sub-system, and
(f) a selector-multiplier configured to receive video data from said selector and said third sub-system respectively, as well as the degree of transparency α from said third sub-system, and to execute a calculation:

$$D1*\alpha+D2*(1-\alpha)$$

where D1 denotes the video data from said selector and D2 denotes the video data from said third sub-system, and to select either a result of the calculation or the video data from said selector in accordance with a result of comparison of the two depth coordinate Z values by said second Z-comparator.

5. An information processing apparatus comprising a plurality of graphic sub-systems coupled in series to each other, each of said sub-systems comprising:

(a) a processor unit configured to execute a graphical program;

(b) a main memory configured to communicate with said corresponding processor unit, and to store said graphical program and graphical data for use in executing said graphical program;

(c) a graphic processor unit configured to communicate with said corresponding processor unit, and to output internal video data, an internal depth coordinate Z value and a degree of transparency α;

(d) a graphic memory configured to communicate with said corresponding graphic processor;

(e) an input port configured to receive external video data and an external depth coordinate Z value from a previous sub-system in an upstream side;

(f) a Z-comparator configured to receive the internal depth coordinate Z value from said corresponding graphic processor unit and the external depth coordinate Z value from said corresponding input port, and to compare the internal depth coordinate Z value and the external depth coordinate Z value;

(g) a selector configured to receive the internal video data from said corresponding graphic processor unit, the external video data from said corresponding input port and the degree of transparency a from said graphic processor unit, and to select one of the video data in accordance with a result of comparison of the two depth coordinate Z values by said Z-comparator, and to execute a calculation:

$$D1*\alpha+D2*(1-\alpha)$$

where D1 denotes the video data from said input port and D2 denotes the video data from said graphic processor, and selecting either a result of the calculation or the video data from said input port in accordance with the result of comparison of the two depth coordinate Z values by said Z-comparator; and (h) an output port configured to output either the internal video data or the external video data selected by said selector.

6. The information processing apparatus as claimed in claim 5, wherein said graphic memory has a first frame buffer area, a first z buffer area, a second frame buffer area and a second z buffer area.

7. The information processing apparatus as claimed in claim 5, further comprising a controller configured to receive command data from an external device and to supply said command data to each of said graphic sub-systems through a common bus.

8. The information processing apparatus as claimed in claim 7, wherein said external device is a joystick configured to be used for playing a video game, and the command data is generated in response to manipulation by a video game player.

9. The information processing apparatus as claimed in claim 5, wherein each of the graphical programs includes:

a first module for determining the three dimensional moving geometrical data and being redundantly executed in each said graphic sub-system; and a second module for obtaining a two-dimensional view to be displayed on a monitor and being differently executed in each said graphic sub-system in accordance with a process for which each said graphic sub-system is responsible.

10. The information processing apparatus as claimed in claim 9, wherein the two-dimension view to be displayed on the monitor is a bird's eye view.

11. The information processing apparatus as claimed in claim 9, wherein one of said sub-systems is responsible for handling a background view, and all others of said sub-systems are responsible for handling motion characters.

* * * * *